(12) United States Patent
Shikuma

(10) Patent No.: US 9,196,304 B2
(45) Date of Patent: Nov. 24, 2015

(54) METHOD AND SYSTEM FOR PROVIDING DAILIES AND EDITED VIDEO TO USERS

(75) Inventor: Theodore M. Shikuma, Torrance, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 11/627,185

(22) Filed: Jan. 25, 2007

(65) Prior Publication Data

US 2008/0028318 A1 Jan. 31, 2008

Related U.S. Application Data

(60) Provisional application No. 61/763,149, filed on Jan. 26, 2006.

(51) Int. Cl.
| | |
|---|---|
| H04N 21/6547 | (2011.01) |
| H04N 21/475 | (2011.01) |
| H04N 21/45 | (2011.01) |
| H04N 21/4227 | (2011.01) |
| G11B 27/034 | (2006.01) |
| G11B 27/34 | (2006.01) |

(52) U.S. Cl.
CPC ............. *G11B 27/034* (2013.01); *G11B 27/34* (2013.01); *H04N 21/4227* (2013.01); *H04N 21/4532* (2013.01); *H04N 21/475* (2013.01); *H04N 21/4751* (2013.01); *H04N 21/6547* (2013.01)

(58) Field of Classification Search
USPC ......................................................... 725/142
See application file for complete search history.

(56) References Cited

U.S. PATENT DOCUMENTS

| | | | |
|---|---|---|---|
| 5,151,725 A | 9/1992 | Liljegren et al. | |
| 5,206,929 A | 4/1993 | Langford et al. | |
| 5,506,639 A | 4/1996 | Frazen et al. | |
| 5,841,512 A | 11/1998 | Goodhill | |
| 5,877,842 A | 3/1999 | Gibbens et al. | |
| 5,956,716 A | 9/1999 | Kenner et al. | |
| 6,317,191 B1 | 11/2001 | James et al. | |
| 6,735,776 B1 | 5/2004 | Legate | |
| 6,775,518 B2 * | 8/2004 | Norcott et al. | 434/350 |
| 6,792,411 B1 | 9/2004 | Massey, Jr. | |

(Continued)

FOREIGN PATENT DOCUMENTS

| | | |
|---|---|---|
| CN | 1376993 | 10/2002 |
| JP | 08-212114 A | 8/1996 |

(Continued)

OTHER PUBLICATIONS

U.S. Appl. No. 60/671,375, pp. 1-5.*

(Continued)

*Primary Examiner* — Pankaj Kumar
*Assistant Examiner* — Usha Raman
(74) *Attorney, Agent, or Firm* — Fitch, Even, Tabin & Flannery, LLP

(57) ABSTRACT

A method for use in providing video to a user includes establishing digital video data that includes images shot in relation to a making of content, uploading the digital video data to a server, and sending the digital video data from the server through a network to a client device for viewing by the user. A system for use in providing video to a user and a storage medium storing a computer program executable by a processor based system are also disclosed.

9 Claims, 27 Drawing Sheets

(56) References Cited

U.S. PATENT DOCUMENTS

| | | | |
|---|---|---|---|
| 6,856,970 B1* | 2/2005 | Campbell et al. | 705/35 |
| 6,865,555 B2 | 3/2005 | Novak | |
| 6,925,474 B2 | 8/2005 | McGrath et al. | |
| 6,970,849 B1 | 11/2005 | DeMello et al. | |
| 6,985,934 B1 | 1/2006 | Armstrong et al. | |
| 6,995,793 B1 | 2/2006 | Albadawi et al. | |
| 6,996,720 B1 | 2/2006 | DeMello et al. | |
| 7,039,655 B2 | 5/2006 | Kapczynski et al. | |
| 7,069,296 B2* | 6/2006 | Moller et al. | 709/203 |
| 7,248,778 B1 | 7/2007 | Anderson et al. | |
| 7,376,183 B2* | 5/2008 | Weigand et al. | 375/240 |
| 7,660,416 B1* | 2/2010 | Kline | 380/216 |
| 8,166,501 B2 | 4/2012 | Shikuma et al. | |
| 2001/0011238 A1 | 8/2001 | Eberhard et al. | |
| 2002/0011988 A1 | 1/2002 | Sai et al. | |
| 2002/0171686 A1 | 11/2002 | Kamen et al. | |
| 2002/0199184 A1* | 12/2002 | Cezeaux | 725/9 |
| 2003/0090511 A1 | 5/2003 | Belknap et al. | |
| 2003/0140034 A1* | 7/2003 | Probst et al. | 707/3 |
| 2003/0225641 A1* | 12/2003 | Gritzmacher et al. | 705/34 |
| 2004/0003079 A1* | 1/2004 | Aiu et al. | 709/225 |
| 2004/0128680 A1* | 7/2004 | Karaoguz et al. | 725/25 |
| 2004/0250130 A1* | 12/2004 | Billharz et al. | 713/201 |
| 2005/0022252 A1 | 1/2005 | Shen | |
| 2005/0114894 A1* | 5/2005 | Hoerl | 725/74 |
| 2005/0163462 A1 | 7/2005 | Pratt et al. | |
| 2005/0165840 A1 | 7/2005 | Pratt et al. | |
| 2005/0183018 A1 | 8/2005 | Shinkai et al. | |
| 2005/0254649 A1* | 11/2005 | Demos | 380/205 |
| 2005/0278257 A1 | 12/2005 | Barr et al. | |
| 2006/0010162 A1 | 1/2006 | Stevens et al. | |
| 2006/0047698 A1 | 3/2006 | Fox | |
| 2006/0156371 A1* | 7/2006 | Maetz et al. | 725/132 |
| 2006/0164422 A1* | 7/2006 | Wurtzel et al. | 345/473 |
| 2007/0005387 A1* | 1/2007 | Deane et al. | 705/1 |
| 2007/0214157 A1 | 9/2007 | Kegeli | |
| 2009/0172757 A1* | 7/2009 | Aldrey et al. | 725/110 |
| 2011/0088070 A1* | 4/2011 | Pham et al. | 725/109 |
| 2011/0113122 A1* | 5/2011 | Drope | 709/219 |
| 2011/0185392 A1* | 7/2011 | Walker | 725/82 |

FOREIGN PATENT DOCUMENTS

| | | |
|---|---|---|
| JP | 2001-148155 A | 5/2001 |
| JP | 2002-359811 A | 12/2002 |
| JP | 2003-32251 A | 1/2003 |
| JP | 2003-134446 A | 5/2003 |
| JP | 2003-141069 A | 5/2003 |
| JP | 2003-143574 A | 5/2003 |
| JP | 2004-502993 A | 1/2004 |
| JP | 2004-364255 A | 12/2004 |
| JP | 2005-079988 A | 3/2005 |
| JP | 2005-107986 A | 4/2005 |
| WO | 98/13761 A1 | 4/1998 |
| WO | 0163911 A2 | 8/2001 |
| WO | 2005081123 A1 | 9/2005 |
| WO | 2007/087627 A2 | 8/2007 |

OTHER PUBLICATIONS

U.S. Appl. No. 11/627,218, filed Jan. 25, 2007, Shikuma et al.
Below the Line; "Dailies, Dubs & More;" http://www.daxsolutions.com/dax_btl_may_2004.jpg; May 2004; p. 1; Below the Line; Los Angeles, California.
Below the Line; "Digital Dailies Help Streamline Lions Gate Film;" http://www.daxsolutions.com/staticmedia/below_line_article.pdf; May 2003; p. 1; Below the Line; Los Angeles, California.
Betzel, Brady; "Miramax's 'Gone Baby Gone' taps DAX for Dailies Approval;" http://www.daxsolutions.com/Miramax_DAX_article_July06.pdf; Jul. 2006; p. 1; POST Magazine.
Business Wire; "(BW) (CA-MESoft-Partners) MESoft Partners LLC Introduces Digital Dailies Review and Approval Software at NAB 2003; Software Integrates Digital Technology onto Film Set; Enhances Digital Film-Making Process;" http://www.businesswire.com/cgi-bin/ts_headline.sh?/bw.040703/230975979; Apr. 7, 2003; pp. 1-2; Business Wire; Burbank, California.
MESoft, Inc.; "DATA First: Enabling the Digital Workflow of Media with All Data from Manufacturing to Distribution;" Feb. 2004; pp. 1-4; MESoft, Inc.
MESoft, Inc.; "MESoft News;" http://www.mesoft.com/web1/news.html; First Printed Jan. 18, 2007; pp. 1-4; MESoft, Inc.; Burbank, California.
MESoft, Inc.; "MGM Pictures Standardizes on MESoft for Dailies;" http://www.mesoft.com/v3/news-mgm_standardizes_on_mesoft_for_dailies.asp; Apr. 18, 2005; pp. 1-2; MESoft, Inc.; Burbank, California.
PR Web Press Release Newswire; "MESoft Partners LLC Introduces Digital Dailies Review and Approval Software at NAB 2003; Software Integrates Digital Technology onto Film Set; Enhances Digital Film-Making Process;" http://www.prweb.com/printer.php-?prid=63066.php; Apr. 16, 2003; pp. 1-2; PR Web Press Release Newswire; Burbank, California.
Sherman, Kenneth; "Dailies; Streaming Along;" http://www.daxsolutions.com/production_update_article.pdf; Production Update Magazine, Feb. 2003; pp. 24-27; DAX Solutions, Inc.; Los Angeles, California.
VitalStream, Inc.; "VitalStream Teams with MESoft to Deliver Secure Digital Workflow Solutions to the Media and Entertainment Industry;" http://www.vitalstream.com/news/release-04-22-03.html; Apr. 22, 2003; pp. 1-2; VitalStream, Inc.; Irvine, California.
USPTO Office Action in U.S. Appl. No. 11/627,218 dated Jun. 17, 2008; 8 pages.
Patent Cooperation Treaty "Notification of Transmittal of the International Search Report and the Written Opinion of the International Searching Authority, or the Declaration" issued in corresponding International Application No. PCT/US07/61127 dated May 28, 2008; 2 pages.
Patent Cooperation Treaty "International Search Report" issued in corresponding International Application No. PCT/US07/61127 dated May 28, 2008; 3 pages.
Patent Cooperation Treaty "Written Opinion of the International Searching Authority" issued in corresponding International Application No. PCT/US07/61127 dated May 28, 2008; 8 pages.
USPTO; Office Action issued in U.S. Appl. No. 11/627,218; mailed Jan. 9, 2009; 10 pages.
USPTO; "Office Action" issued in U.S. Appl. No. 11/627,218; mailed Jun. 18, 2009; 13 pages.
PCT; "International Preliminary Report on Patentability" issued in International Application No. PCT/US2007/061127; dated Jul. 29, 2008; 7 pages.
USPTO; "Final Office Action" issued in U.S. Appl. No. 11/627,218; mailed Mar. 4, 2010; 16 pages.
State Intellectual Property Office of the People'S Republic of China; "The Second Office Action" issued in corresponding Chinese Patent Application No. 200780011194.3; Date of Issue Oct. 29, 2010; 9 pages, English translation.
USPTO; "Notice of Allowance and Fees Due" issued in U.S. Appl. No. 11/627,218; mailed Sep. 22, 2010; 5 pages.
State Intellectual Property Office of the People's Republic of China; "The First Office Action" issued in corresponding Chinese Patent Application No. 200780011194.3; Date of Issue Apr. 8, 2010; 26 pages, including English translation.
European Patent Office; "Extended European Search Report (including the Supplementary European Search Report and the European Search Opinion)" issued in European Application No. 07762616.6 for PCT/US2007/061127; dated Jan. 21, 2011; 9 pages.
Japanese Patent Office; "Notification of Reasons for Rejection" issued in corresponding Japanese Application No. 2008-552591; dated Aug. 22, 2011; 4 pages.
Chinese Patent Office; "The Third Office Action" issued in corresponding Chinese Application No. 200780011194.3; dated Apr. 8, 2011; 16 pages.
USPTO; Notice of Allowance issued in U.S. Appl. No. 11/627,218; mailed Jun. 23, 2011; 5 pages.
Fotis Kazasis et al: "Designing Ubiquitous Personalized TV-Anytime Services"; Jan. 1, 2003; pp. 136-149; XP55010080, Retrieved

(56) References Cited

OTHER PUBLICATIONS from the Internet: URL:http://sunsite.informatik.rwth-aachen.de/Publications/CEUR-WSII; Vol-75/files/UMICS_12.pdf [retrieved on Oct. 20, 2011].
European Patent Office; "Communication pursuant to Article 94(3) EPC" issued in corresponding European Patent Application No. 07 762 616-6-2223; Oct. 27, 2011; 6 pages.
U.S. Patent and Trademark Office; "Notice of Allowance and Fee(s) Due" issued in U.S. Appl. No. 11/627,218; mailed Sep. 14, 2011; 5 pages.
State Intellectual Property Office of China (SIPO); "Notice of Registration and Notice of Grant of a Patent Right for an Invention" for corresponding Chinese Patent Application No. 200780011194.3; Dated Oct. 20, 2011; 5 Pages.
USPTO, Notice of Allowance issued in U.S. Appl. No. 11/627,218 mailed Dec. 15, 2011, 5 pages.
Japanese Patent Office; Final Notification of Reasons for Refusal issued in Japanese Patent Application No. 2008-552591, dated Nov. 12, 2012, 3 pages.
Japanese Patent Office; Notification of Reasons for Refusal (Office Action) issued in corresponding Japanese Patent Application No. 2008-552591, dated Jan. 27, 2014, includes currently pending claims that were examined, 28 pages.
Japanese Patent Office; Notification of Reasons for Refusal (Office Action) issued in corresponding Japanese Patent Application No. 2008-552591, dated Jan. 27, 2014, includes English language comments and currently pending claims that were examined, 29 pages.
Japanese Patent Office; Notification of Reasons for Refusal (Office Action) issued in corresponding Japanese Patent Application No. 2012-010891, dated May 27, 2013, 5 pages (includes English translation).
Japanese Patent Office; Decision of Final Rejection issued in corresponding Japanese Patent Application No. 2008-552591, dated Jun. 11, 2012, 4 pages (includes English translation).
Takagi, Shinichi; "A Proposal and Implementation of Video Editing System Using Web Browser Over Broadband Network", The Journal of the Institute of Image Electronics Engineers of Japan, The Institute of Image Electronics Engineers of Japan, May 2003, vol. 32, No. 5, pp. 645-658.
Japanese Patent Office; Decision for Final Rejection issued in corresponding Japanese Patent Application No. 2012-10891, dated Dec. 1, 2014, includes a partial English language translation and the currently pending claims that were examined, 9 pages.
Japanese Patent Office; "Preappeal Review Report" issued in corresponding Japanese Patent Application No. 2012-10891, dated Jun. 24, 2015, includes a partial English language translation of the currently pending claims that were examined, 11 pages.

\* cited by examiner

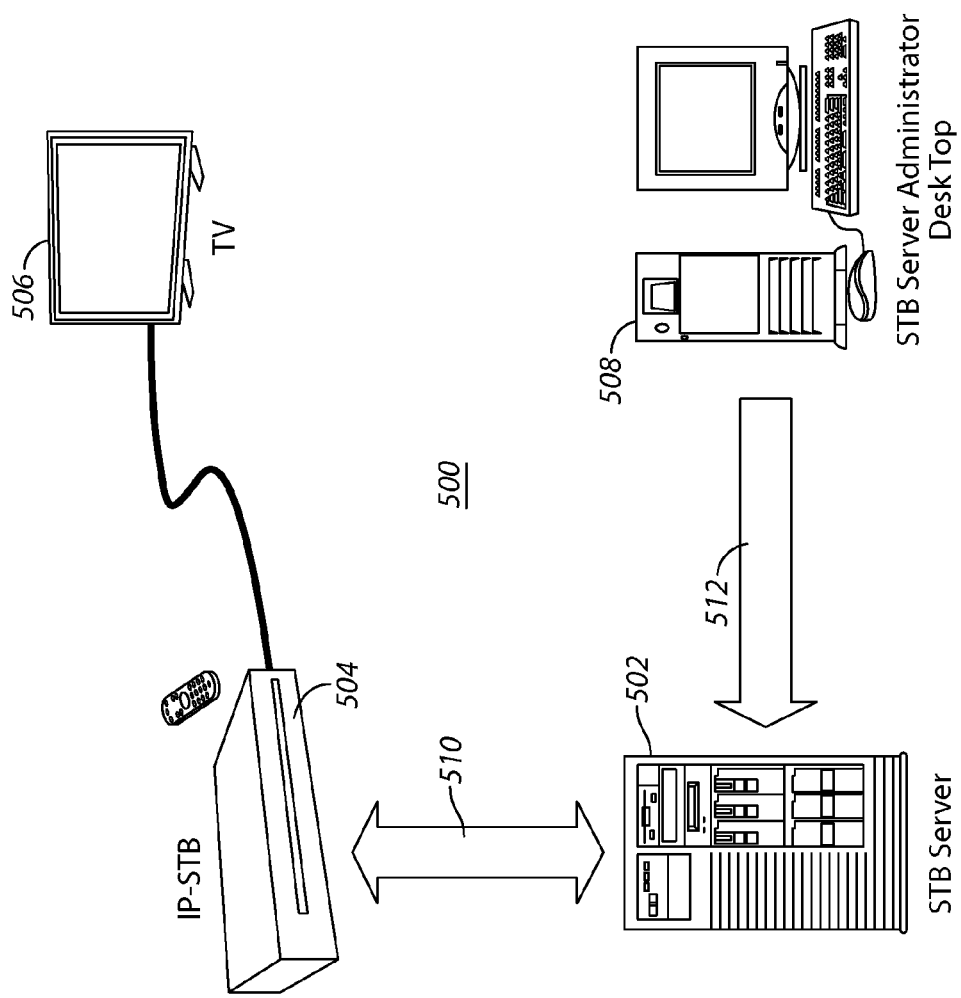

| Database Settings | | Server Settings | | Exit |
|---|---|---|---|---|
| Network Config | Network Speed | | Time/Date Setting | |
| Display Setting | Power Config | | Disk Management | |

Database Settings

IP Address: 100.200.206.195
Database Name: databaseA
User Name: databaseAuser
Password: *********
Confirm Password: *********

[CHECK CONNECTION]   [SAVE SETTINGS]

| Database Settings | Server Settings | Exit |
|---|---|---|
| Network Config | Network Speed | Time/Date Setting |
| Display Setting | Power Config | Disk Mgmt | VPN Setup |

VPN Setup

Enter the VPN Connection Name: [Demo Connection]

Enter the VPN Server IP Address: [172.24.33.45]

[SAVE]

*VPN Connection is currently disabled.*
*To enable, click the 'ENABLE' button*

[ENABLE]

*FIG. 12*

METHOD AND SYSTEM FOR PROVIDING DAILIES AND EDITED VIDEO TO USERS

CROSS-REFERENCE TO RELATED APPLICATIONS

This application claims the benefit of U.S. Provisional Patent Application No. 60/763,149, filed Jan. 26, 2006, entitled "SET TOP BOX SYSTEM FOR DIGITAL DAILIES," the entire disclosure of which is hereby incorporated herein by reference in its entirety.

This application is related to U.S. patent application Ser. No. 11/627,218, filed on Jan. 25, 2007, now U.S. Pat. No. 8,166,501, entitled "SCHEME FOR USE WITH CLIENT DEVICE INTERFACE IN SYSTEM FOR PROVIDING DAILIES AND EDITED VIDEO TO USERS," the entire disclosure of which is hereby incorporated herein by reference in its entirety.

BACKGROUND OF THE INVENTION

1. Field of the Invention

The present invention relates generally to filmmaking and the making of other content, and more specifically to the review of such content during its making or production.

2. Discussion of the Related Art

The term "dailies" is generally used to describe the raw, unedited and/or uncut footage shot each day during the making, filming and/or production of a motion picture, movie, television program, commercial, etc. Dailies, which are also sometimes called "rushes," may include the previous day's scenes, processed overnight by a lab, and screened after work the next day by the producer, director and/or crew heads to chart the progress of the film and/or for preliminary edits and cuts. Dailies may be made by developing the day's footage, synchronizing it to sound, and printing it on film for viewing by the director very early the next day. However, the term dailies may be used to refer to any raw footage, regardless of when it is developed or printed.

It is with respect to these and other background information factors that the present invention has evolved.

SUMMARY OF THE INVENTION

One embodiment provides a method for use in providing video to a user, comprising: establishing digital video data that includes images shot in relation to a making of content; uploading the digital video data to a server; sending the digital video data from the server through a network to a client device for viewing by the user; and providing an ability to remotely administer the digital video data that is provided to the client device.

Another embodiment provides a system for use in providing video to a user, comprising: a server, coupled to a network, that is configured to receive uploaded digital video data that includes images shot in relation to a making of content; and a client device, coupled to the network, that is configured to receive the digital video data from the server and display it for viewing by the user; wherein the server is configured to send the digital video data from the server through the network to the client device; wherein the client device is configured to display a listing of productions, a listing of production types for a selected production, a listing of dates present for a selected production type, and a listing of all clips present for a selected date.

Another embodiment provides a storage medium, storing a computer program executable by a processor based system, the computer program causing the processor based system to execute steps comprising: receiving uploaded digital video data that includes images shot in relation to a making of content; and sending the digital video data through a network to a client device for viewing by a user; wherein the client device is configured to automatically track and expire one or more portions of the digital video data that is provided to the client device based on production priorities.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 5 is a block diagram illustrating another embodiment of a system that may be used for implementing the method shown in FIG. 1;

FIGS. 7, 8, 9, 10, 11, 12 and 13 are screen shots illustrating an example interface that may be used for implementing an STB administration GUI in accordance with an embodiment of the present invention;

DETAILED DESCRIPTION

Figure 2:
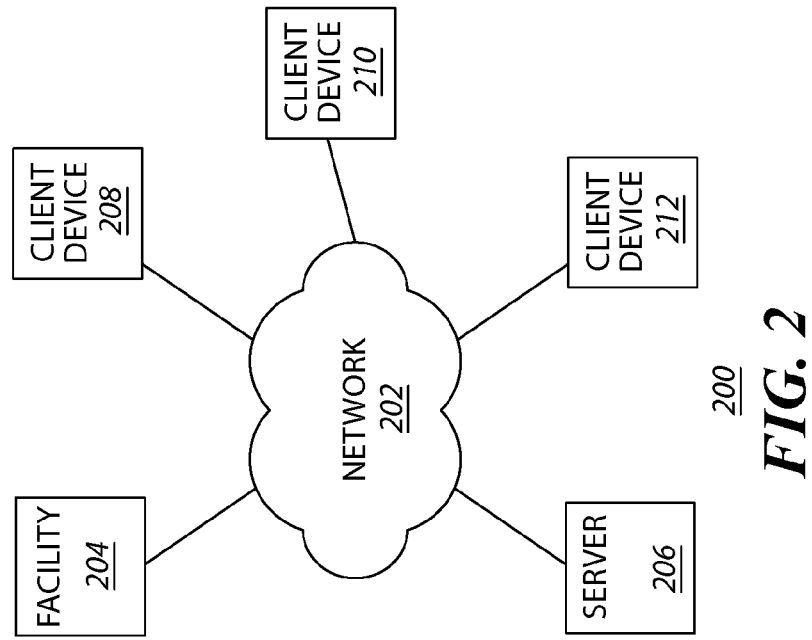
FIG. 2 is a block diagram illustrating an embodiment of a system that may be used for implementing the method shown in FIG. 1.

Currently, the process of making dailies and forwarding them to directors and executives for review can take as long as approximately two to five days. For example, the workflow may involve a post house creating master tapes, shipping the tapes to a post production facility, encoding the tapes to MPEG2 files, authoring a DVD master, watermarking and duplicating DVDs, performing a DVD quality check, and then shipping the DVDs to executives. This is a relatively time consuming process and involves the use of physical media, i.e. the DVDs.

Embodiments of the present invention provide methods and apparatus to implement techniques for developing and presenting audio and video content during and after the making or production of any type of content, such as for example television programs, motion pictures, movies, sales and marketing content, advertisements, commercials, games, etc. That is, such content may comprise, for example, a movie, television program, advertisement, motion picture, video, game, etc. In one embodiment, both raw and edited video data may be uploaded to a server and distributed over computer networks (e.g. FTP, http) for review by the user, such as a director, executive, etc. By way of example, raw video may include dailies, casting video, etc., and edited video may include rough cuts, final cuts, etc. Such raw and edited video data may also be referred to herein as content. In some embodiments any video file content may be uploaded, including but not limited to any Windows Media or MPEG video file. In some embodiments the system may support not only Windows Media, but other formats as well such as MPEG-4, MPEG2, MPEG-1, QuickTime formats and codecs. In some embodiments, a post house, post production facility, or similar facility may upload the digital video data or other content to the server.

The server may then send the digital video data from the server through a network, such as a computer or cable network, to a client device for viewing by the user. As will be discussed below, in some embodiments the client device may comprise a set-top box (STB) and a connected video or computer display device. By way of example, the video or computer display device may comprise, but is not limited to, a television, plasma TV, LCD TV, high definition TV, PC monitor, digital projector, etc. The server may be referred to herein as a dailies, digital dailies, or STB server. In some embodiments the STB server may secure and/or protect the digital video data or other content before it is sent to the set-top boxes. One such protection may include the use of High-Bandwidth Digital-Content Protection (HDCP) whereby the data being sent from the STB to the display device is encrypted. The user, such as a director, executive, etc., then views the dailies, rough cuts, etc. using the set-top box.

As will also be discussed below, in some embodiments the client device may comprise a computer, such as a personal computer (PC) or any other type of computer. The server may send the digital video data to the client device by streaming the digital video data. In some embodiments the STB server may secure or protect the digital video data or other content before it is streamed. The user then views the dailies, rough cuts, etc. on the PC by watching the streamed video.

Embodiments of the present invention can substantially reduce the time it takes to make dailies or edited video and forward them to directors and executives for review. By way of example, in some embodiments the workflow may reduce dailies production from approximately two to five days to approximately four hours. By uploading directly from a post production or similar facility to a digital dailies server, protecting the content with, for example, digital rights management (DRM) or watermarking (invisible or visible), and automatically distributing to set-top boxes, directors and/or executives are able to view dailies, rough cuts, final cuts, etc. on a TV or other display in a secure and time sensitive manner.

Figure 1:
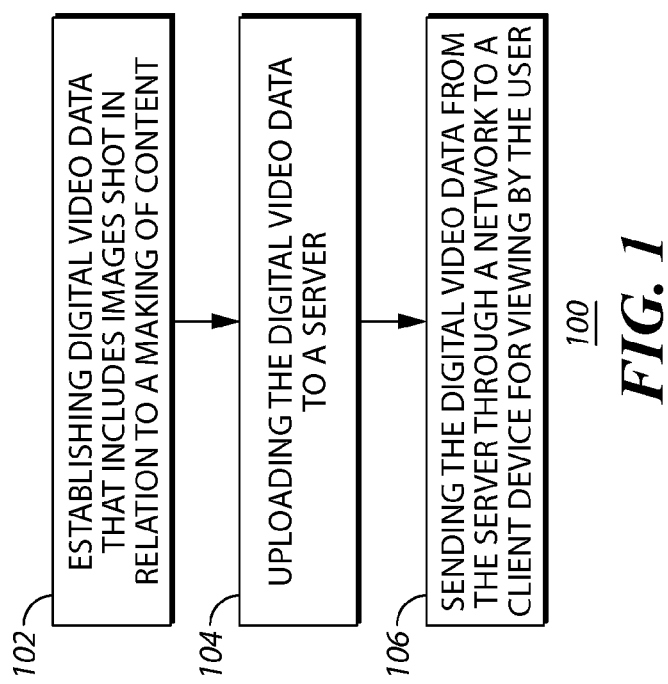
FIG. 1 is a flow diagram illustrating a method for use in providing video to a user in accordance with an embodiment of the present invention.

Referring to FIG. 1, there is illustrated a method 100 that operates in accordance with an embodiment of the present invention. The method 100 may be used in providing video to a user. The method 100 begins in step 102 where digital video data is established that includes images shot in relation to a making of content. As mentioned above, the content that is being made may include, but is not limited to, motion pictures, television shows, programs, films, movies, videos, websites, commercials, advertisements, documentaries, video games, etc. In some embodiments the making of content may include the filming, shooting, producing, etc., of the content.

In some embodiments, the step of establishing digital video data may be performed by a post house, post production facility, or similar facility. In some embodiments, the digital video data may be established by converting the motion picture film images into video signals, electronic signals, or digital data, such as for example, by the telecine process, or by encoding the film images into a digital format, such as an MPEG format.

In some embodiments the images shot in relation to the making of content may comprise footage shot during the making of the content, such as for example, dailies. In some embodiments the images shot in relation to the making of content may comprise edited footage shot during the making of the content, such as for example, rough cuts, final cuts, proposed cuts, etc. And in some embodiments the images shot in relation to the making of content may comprise casting video.

In step 104 the digital video data is uploaded to a server, such as for example a dailies or STB server mentioned above. In some embodiments, this step may be performed by a post house, post production facility, or similar facility.

In some embodiments, the server may then secure or protect the digital video data. For example, the digital video data or other content may be secured with digital rights management (DRM) and/or watermarked, or some other security scheme may be used.

In step 106 the digital video data is sent from the server through a network to a client device for viewing by the user. The network may comprise a computer network, such as the Internet, a cable television network, or some other network. In some embodiments, the digital video data or other content may be delivered securely using virtual private networking (VPN) technology. Some embodiments may encrypt the communications between the server and the client device (such as a set-top box). Or, a secure sockets layer (SSL) may be used on the server. As mentioned above, in some embodiments the client device may comprise a set-top box with a connected display. And in some embodiments the client device may comprise a PC and the step of sending the digital video data may comprise streaming the digital video data.

Referring to FIG. 2, there is illustrated a system 200 that may be used for implementing the above described method in accordance with an embodiment of the present invention. The system 200 includes a network 202, which for example may comprise the Internet, some other computer network, a cable television network, or some other network. In some embodiments, a facility 204, such as for example a post house, post production facility, or similar facility, has access to the network 202. The facility 204 may establish digital video data that includes images shot in relation to a making of content, and then upload the digital video data to a server 206 that is coupled to the network 202. The server 206 may comprise, for example, a dailies or STB server mentioned above. The server 206 may then send the digital video data through the network 202 to any number of client devices 208, 210, 212 for viewing by users.

Again, the client devices or user machines may comprise an STB or a PC such as a lap-top computer. The PC version may include a video decoder or similar device. In some embodiments the STB may comprise an embedded PC in a very small desktop package. Both the PC and STB can perform both store and forward or streaming functions, which will be discussed more below and which may be implemented in software.

Figure 3:
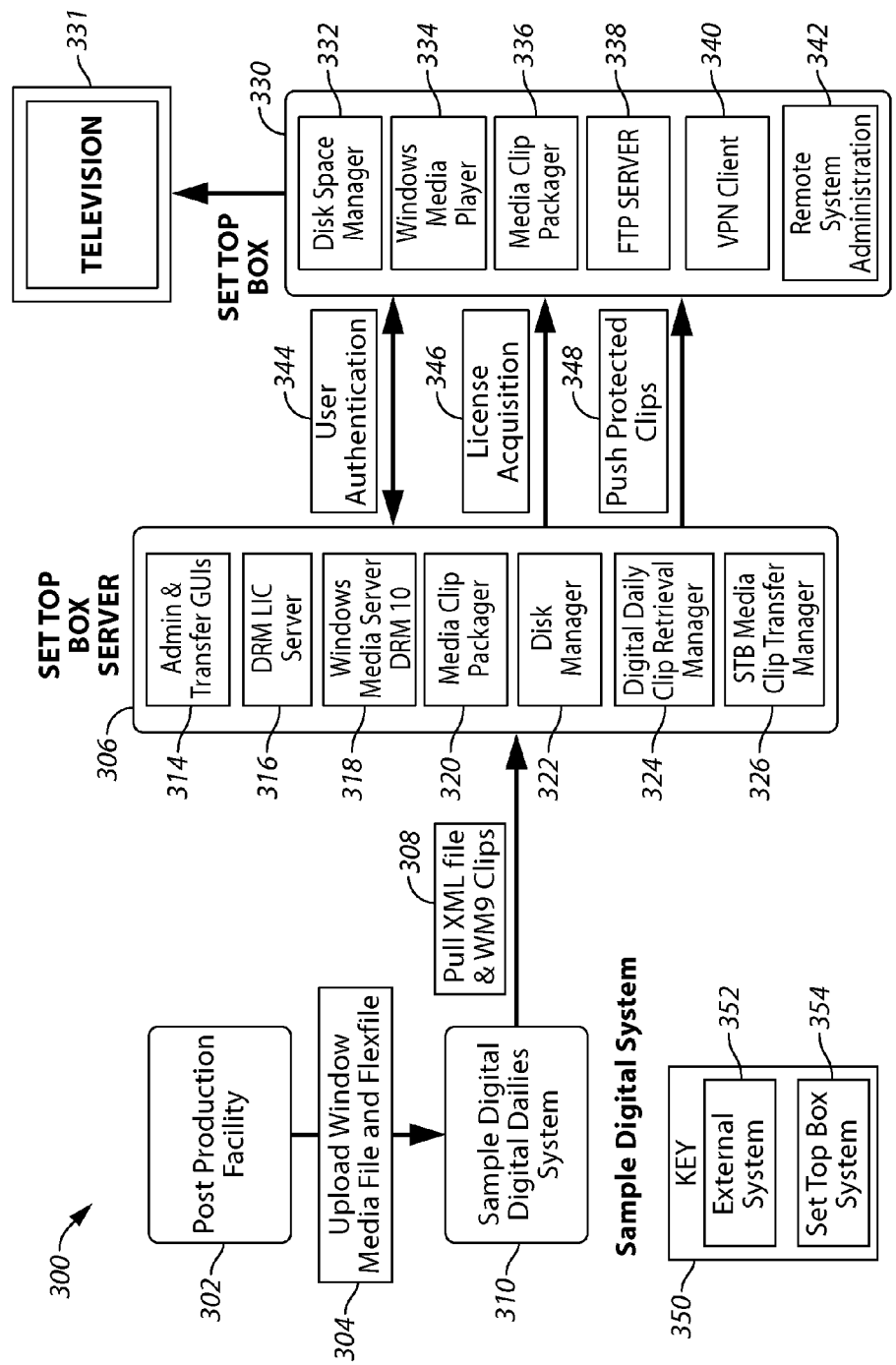
FIG. 3 is a block diagram illustrating another embodiment of a system that may be used for implementing the method shown in FIG. 1.

Referring to FIG. 3, there is illustrated a system 300 that may also be used for implementing the above described method in accordance with an embodiment of the present invention. The system 300 is an example of a system where the client device comprises a set-top box with a connected display. In some embodiments of the set-top box scenario, an Intranet store and forward solution may be utilized. The system 300 is an example of one embodiment or implementation of a production system.

Specifically, the architecture for system 300 may include a sample digital system that includes a post production facility 302 from which digital video data or any Windows Media file and flexfile may be uploaded, as indicated by block 304. Digital video data may then be sent to a set-top box (STB) server 306 by pulling XML files and Windows Media (e.g. WM9) clips, as indicated by block 308 and the Sample Digital Dailies system 310.

Thus, production content may be uploaded to a central server system 306 for automatic distribution to one or more set-top boxes. In some embodiments, the STB server 306 may include administrative and transfer graphical user interfaces (GUIs) 314, a digital rights management (DRM) licensed internal code (LIC) server 316, a Windows Media server DRM (10) 318, a media clip packager 320, a disk manager 322, a digital daily clip retrieval manager 324, and a STB media clip transfer manager 326.

A set-top box (STB) 330 and connected display 331, such as a television or other display, may be located where a user, such as a director or executive, has access to them. In some embodiments, the STB 330 may include a disk space manager 332, a Windows Media Player 334, a media clip packager 336, an FTP server 338, a VPN client 340, and/or a remote system administration block 342.

In some embodiments, user authentication 344 may be required before digital video data is sent from the server 306 to the STB 330. Upon successful user authentication, license acquisition 346 may be made by the STB 330. Protected clips of digital video data may then be pushed 348 to the STB 330.

In some embodiments, the STB 330 may provide support for automatically tracking and expiring content. That is, in some embodiments the system may automatically track and expire the content that is provided to the set-top boxes. The content may be expired based on priority and/or production requirements. For example, the least important content may be deleted first.

In some embodiments the system may distribute content to the set-top boxes based on production priorities or some other priority. For example, the content for the most important production may be distributed to the set-top boxes first. In this way content distribution may be based on production priorities.

In some embodiments, the STB 330 may also provide support for automated digital workflows, remote system administration, content distribution prioritization policies, playlists and custom playlists, and/or computer network (LAN/WAN) content distribution and control. In some embodiments, the STB 330 may be integrated with other components and include an asset management system. For example, the STB 330 may be integrated into or implemented as part of the is display device or another device (e.g. a computer system). In some embodiments, the STB 330 may provide support for various video, audio and computer interfaces, such as for example, HDMI, DVI, S-Video (YUV), Composite Video (NTSC), Component Video (Y, PB, PR), Analog Audio, Digital Audio (SPDIF), 100-BASE-T, Ethernet, etc. In some embodiments the STB 330 (or any other type of client device) may be connected to a projector or similar device for viewing the dailies, rough cuts, final cuts, etc.

In some embodiments, the system 300 may be implemented and organized in various system components. For example, in some embodiments the key 350 indicates which components may be part of an external system 352 and which components may be part of a set-top box system 354.

In some embodiments a user interface may include an easy to use and navigate graphical user interface (GUI) having easy to use menus. Such GUI may help users having less technical abilities, such as possibly high level executives, to operate the system. Such menus may be easier to use and navigate than a Windows Explorer system.

Some embodiments of such a GUI may include a screen where a production or other item of content may be selected. Once the production is selected, a next screen may show items related to the making of that content, such as for example dailies, rough cuts, final cuts, casting video, etc. In some embodiments such content items may be listed so that the most current items are listed first. For example, items from the most current day or the most current content may be listed first. This may make it easy to find and navigate content. Example implementations of such a GUI will be described below.

Some embodiments of such a GUI may include a screen where a video item of content may be selected. Once the video item has been viewed, the item may be flagged as viewed. The item selected may also be flagged for review. Finally, the selected item may also be flagged for deletion.

Thus, in some embodiments of the set-top box and Intranet store and forward solution content may be uploaded directly from a post production or similar facility to one or more digital dailies servers. In the servers, the content may be protected with DRM and automatically distributed to one or more set-top boxes. In some embodiments production priority and user priority distribution policies may be is used during such distribution.

Benefits of the set-top box and Intranet store and forward solution may include that the system may be tuned for quick delivery of content, a VPN may be supported for remote production viewing, the set-top box may be easy to use, Windows Media Player/DRM may be supported, production and user priority based content transfers may be supported, XML interface to external systems may be used, visible watermarking may be used, and CineSHARE asset management integration may be supported.

With embodiments of this solution, content and digital assets, such as dailies, rough cuts, final cuts, etc., may be delivered quickly and efficiently and be viewed on a television or other accessible monitor/screen. The set-top box may be configured so that it is easy to operate and user friendly. In some embodiments the set-top box may be configured so that it may use existing digital dailies content material and be capable of giving priority to specific productions and users for content distribution. Furthermore, the set-top box may be configured to handle content that is secured with digital rights management (DRM) and/or that is watermarked. In some embodiments the set-top box may be configured so that it may be integrated with an asset management system and/or enable digital workflows.

Figure 4A:
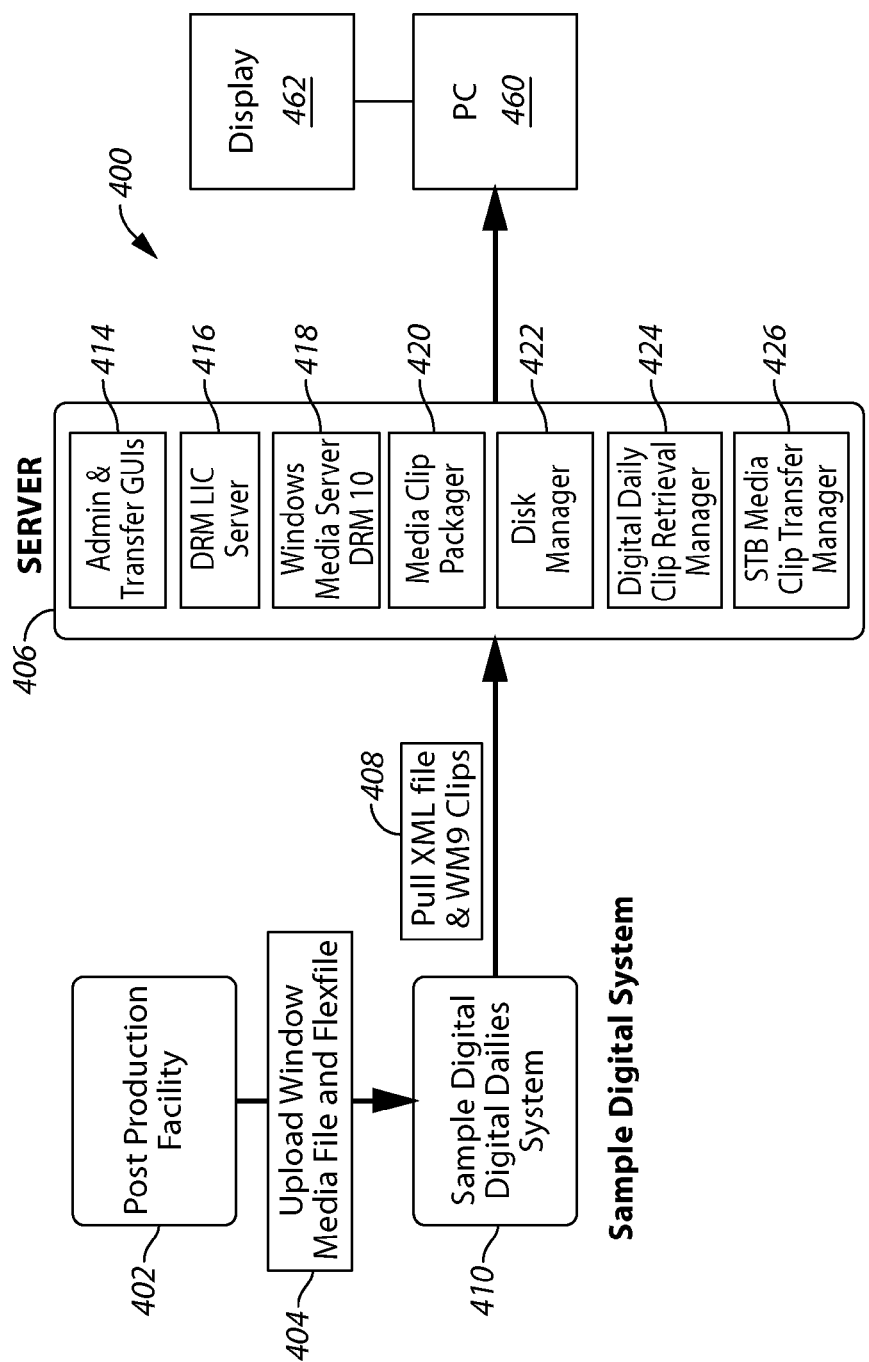
FIG. 4A is a block diagram illustrating another embodiment of a system that may be used for implementing the method shown in FIG. 1.

Referring to FIG. 4A, there is illustrated a system 400 that may also be used for implementing the above described method in accordance with an embodiment of the present invention. The system 400 is an example of a system where the client device comprises a computer, such as a PC, and the step of sending the digital video data comprises streaming the digital video data to the client device. In some embodiments, this scenario may be referred to as an Internet streaming solution.

Similar to the system 300 (FIG. 3), the system 400 may include a sample digital system that includes a post production facility 402 from which digital video data or any Windows Media file and flexfile may be uploaded, as indicated by block 404. Digital video data may then be sent to a server 406 by pulling XML files and Window Media (e.g. WM9) clips, as indicated by block 408 and the sample digital dailies system 410.

Thus, production content may be uploaded to a central server system 406 for automatic distribution to one or more client devices. In some embodiments, the server 406 may include administrative and transfer graphical user interfaces (GUIs) 414, a digital rights management (DRM) licensed internal code (LIC) server 416, a Windows Media server DRM (10) 418, a media clip packager 420, a disk manager 422, a digital daily clip retrieval manager 424, and/or a STB media clip transfer manager 426.

In the illustrated embodiment, the client device comprises a personal computer (PC) 460 and connected display 462, which may be located where a user, such as a director or executive, has access to them. In other embodiments, however, the client device may comprise many different types of devices, such as any type of computer, hand-held device or phone, portable device, entertainment system, game console, etc.

During operation, in some embodiments, the user may view the digital video data by visiting a website. The website may be secure and require that the user enter a username and password to gain access. Once the user logs into the website, the digital video data may then be streamed to the PC 460 so that the user can view the digital video data on the display 462. As described above, in some embodiments the digital video data may correspond to dailies, rough cuts, final cuts, casting video, etc.

Figure 4B:
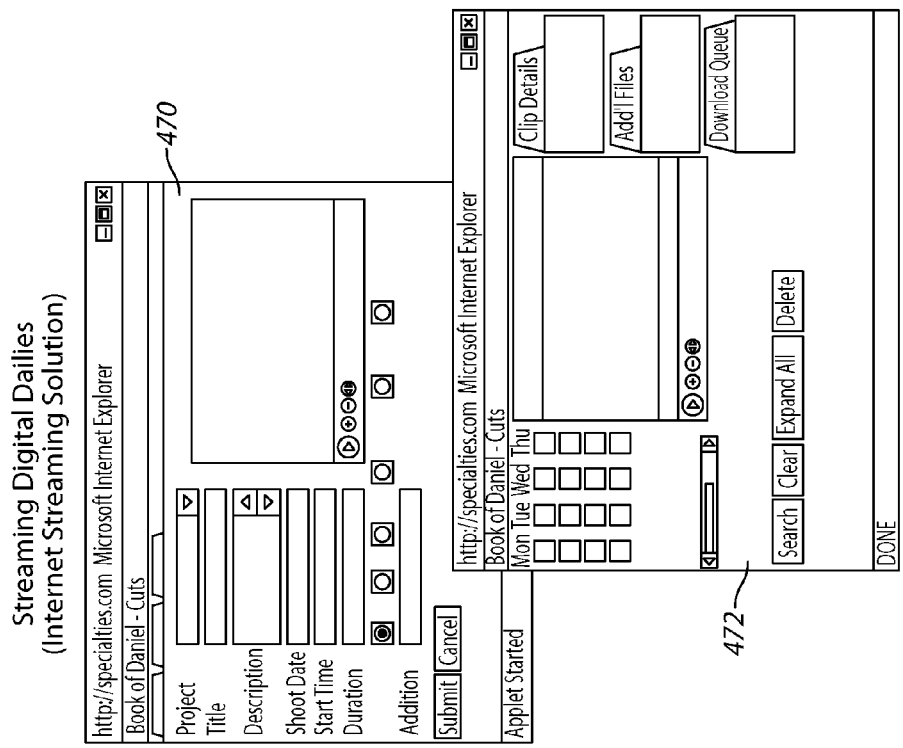
FIG. 4B are screen shots illustrating an example website that may be used with the system shown in FIG. 4A.

FIG. 4B illustrates screen shots 470, 472 of an example website that may be used with the system 400 for an embodiment of the Internet streaming solution. Benefits of this scenario may include that the system may be tuned for low bandwidth networks, a VPN content upload facility may be supported, telecine flexfile and ALE clip chopping may be supported, Windows Media Player/DRM may be supported, digital dailies content streaming may be supported, digital dailies content download may be supported, production and clip collaboration may be supported, light asset management may be supported, and/or the system may be extensible to downstream systems.

In the above discussion both a set-top box Intranet store and forward solution and an Internet streaming solution have been presented. In some embodiments and/or implementations, only one of the two solutions may be used. In other embodiments and/or implementations, the two solutions may be used together, depending on need and convenience. As such, the two solutions may be complementary solutions, and in some embodiments may provide complementary digital dailies systems. In addition, the various example features and goals described in the above examples are applicable to some implementations based on the examples, but other implementations may not include all of the various example features and goals.

Referring to FIG. 5, there is illustrated another system 500 that may also be used for implementing the above described method in accordance with an embodiment of the present invention. The system may include an STB server 502, set-top box 504, TV 506, and STB server administrator desktop 508. Media Clips may be transferred over an IP network and stored on the IP-STB 504 for playback, as indicated by arrow 510. The STB server 502 may be administered locally as well as from remote terminal, such as the STB server administrator desktop 508, as indicated by arrow 512. End-users may access the media clips hosted on IP Set Top Box (STB) 504 through a TV like GUI.

Figure 6:
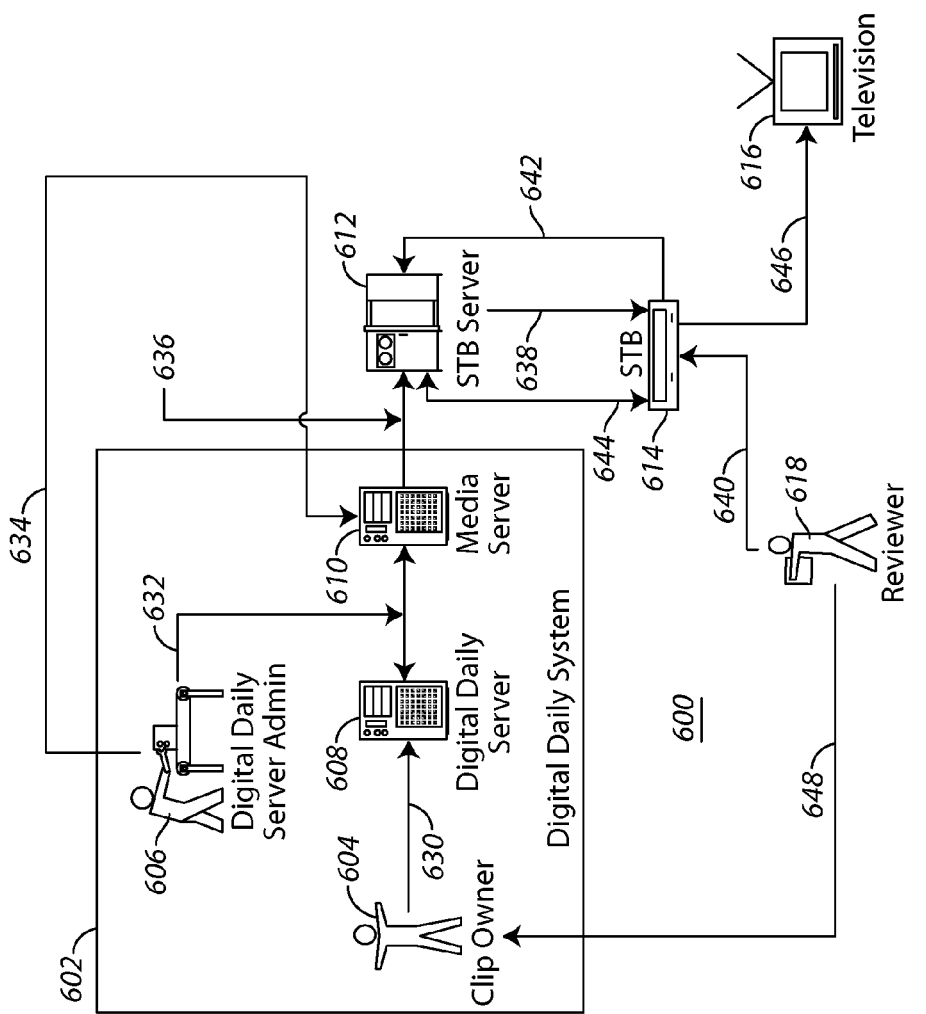
FIG. 6 is a work flow diagram illustrating a method for use in providing video to a user in accordance with an embodiment of the present invention.

Referring to FIG. 6, there is illustrated an example clip distribution workflow 600 in accordance with an embodiment of the present invention. Shown are a digital daily system 602 that includes a clip owner 604, digital daily server administrator 606, digital daily server 608, and a media server 610. Also shown are an STB server 612, STB 614, television 616, and a reviewer 618.

In some embodiments the workflow 600 may proceed as follows. In step 630 TV content and Flex Files are uploaded to the digital daily server 608. In step 632 unprotected clips in the media server 610 may be "Chopped" using Flex File Host. In step 634, XML files may be uploaded to the media server 610 in a shared hot folder. In step 636, XML files are processed and unprotected Clips are transferred to STB Server 612 and DRM is used to protect the clips. In step 638 the clips are pushed to the STB 614. In step 640 the user/reviewer 618 may login. In step 642 the user is authenticated, and then the user navigates and selects a clip for playback, also indicated by 640. In step 644 license acquisition is performed. In step 646 the clip is played back on the television 616. And in step 648 the user/reviewer 618 emails his or her review comments. A license server may also execute on the STB server 612.

Access to the STB may be secured as follows. Each STB may be configured for only one user during STB installation at the user premises. The user may have to provide Personal Identification Number (PIN) to log into the STB. This PIN may be verified against the database entry every time user tries to log-in to the STB.

In some embodiments the user (i.e. STB) gets only those media clips for which he/she has access rights. The access rights may be configured through and administrative web application by creating appropriate association between User, Group and Production.

Some embodiments include the ability to conduct extensive remote administration of the content on the set-top box. For example, content on the set-top box may be deleted remotely, and/or content can be pushed to the set-top box remotely. Furthermore, administrative functions on the set-top box, such as identifying authorized users, may be handled remotely. In this way various functions on the set-top box may be handled remotely.

Some embodiments may include the ability to make the content provided to the set-top boxes more secure. For example, some embodiments include the ability to put a watermark randomly located in the picture. This way, anyone who copies or otherwise captures the content with a recording device, such as a digital video recorder (DVR) or video cassette recorder (VCR), will see a watermark in the picture. In some embodiments the watermark may be made quite apparent. A random number generator may be used for generating the location in the picture of the watermark. One of dozens of areas of the screen may be randomly chosen for the watermark. As mentioned above, such watermarking may be invisible or visible.

In some embodiments, the STB Server Software may include the following components:

Services (these may be installed once and run in the background).

Clip Retrieval Manager: This service monitors the shared folder for new XML files and parses the XML file to build the list of media clips available for distribution.

Clip Packager: This service packages the media clips using, for example, Microsoft DRM 9 Technology.

Clip Transfer Manager: This service is responsible for "pushing" the packaged media clips to STB's (associated with Users) over the network. File Transfer Protocol (FTP) is used for pushing the media clips.

Disk Manager: This service periodically cleans up the STB Server hard disk by deleting the media clips (which are eligible for deletion).

A production may be represented by unique Production Name in the Database. In some embodiments, each production may have four types of media for distribution: Dailies; Rough Cuts; Cine Share; and Finals.

Each User may be represented by a Unique User ID in the Database. Production type (Dailies/Rough Cuts/Cine-SHARE/Finals) may be associated to more than one User.

An "Admin" tab on a Home Page may allow a Master administrator to: Assign Admin rights; and Modify Admin rights. There may be two types of administrators. The master admin and the delegated admin.

The master admin may perform all administrative tasks. He can create new users/productions, modify them, delete them, etc. The master admin can also check the status and generate reports on the entire STB system. He can assign administrative (either master or delegated) rights to any user. If the master administrator creates a delegated admin, the delegated admin also has to be assigned the productions for which he can have admin rights.

The delegated admin may modify/update existing users for the productions which he has rights to. He can create new users but then he has to necessarily associate that user to one of the productions he can administer. The delegated administrator can also check the status and generate the reports for the productions (and users associated to this productions) assigned to him.

A "User" Tab on a Home Page may be used to Manage Users. The screen may allow a user to: add a new user profile; and update an existing User's profile.

Once a User is added to Database, the next step is to associate the User to one or more Productions. The user will get access to only those Productions (i.e. media clips) associated to which the User is associated.

As mentioned above, in some embodiments the Delivery Priority of clips may be set. Since, network bandwidth available for media clip distribution is limited, Production (Dailies or Rough Cuts) media clips may be pushed to User STB's on priority basis. Higher priority media clips may be scheduled to transfer earlier than lower priority media clips. In some embodiments there are four media clip distribution priority levels: High; Medium; Low; and Very Low.

When more than one Production is ready for distribution at a time (i.e. when more than one XML files are uploaded at the same time), transfer to all the Users who are configured with High delivery priority in the highest priority production may be scheduled first, then Medium priority users of the highest priority production and so on. So the Production priority may overweigh the User Priority.

The Production Details may be set up as follows. The following functionality is available through Production Tab page: add a New Production to Database; Modify or Delete a Production from Database; and Associate User(s) to Production. This function enables the administrator to modify or delete the existing production details.

To make a Production accessible to a particular user, the Production may be associated to that user. An "Associate User(s) to Production" link on a Production Tab may be included. This functionality enables the administrator to schedule the transfer of old Production media clips (Dailies, Rough Cuts, CineSHARE or Finals) to Users (STB's). This is a special workflow to allow the capability of manual upload on demand. Those Production media clips which were uploaded earlier during normal workflow (i.e. through upload of XML file) may be pushed to the user.

The set-top box is a one component of the STB Digital Dailies System, allowing Reviewers/Users to playback media clips on a TV. Some embodiments allow the STB to be setup by managing the users and configuring the system specific parameters. In some embodiments, an STB Administration GUI allows the user to configure users for the use of the STB and configure several system parameters related to the STB. For example, an Administration GUI may include two parts: a Main Menu, which allows a user to manage users, manage folders, launch the Configuration menu and restart the system; and a Configuration Menu, which allows a user to configure the system parameters. In some embodiments, the STB may be configured and administered locally by plugging in a USB keyboard, and a USB mouse.

FIGS. 7-13 are screen shots illustrating an example interface that may be used for implementing an STB administration GUI in accordance with an embodiment of the present invention.

A PIN access screen may first be displayed. An STB administrator may be provided with a unique Administrator PIN. Upon entering the correct admin PIN, the user may be prompted to enter the Administrator username and the Administrator password. Depending on the mode of administration desired, the administrator username and the corresponding administrator password may be entered to bring up the appropriate Administrator Screens Console.

In some embodiments, the STB may provide two modes of administration: Master-Admin mode; and Spe-Admin mode.

The Spe-Admin mode of administration may, for example, be used to perform the following activities: Add/Delete/Modify User data; Manage User files and folders; Configure Network Connection speed and IP address; Configure Server and Database connections; Manage Display, Time and Power settings; Modify administrator passwords; Unlock 'Locked Out' users. To enter the Spe-Admin mode of administration, enter the username as spe_admin at the Password Logon screen.

The Master-Admin mode of administration may allow full access to the STB Operating system through the Windows Explorer Shell. This mode of administration may be used to install software updates and apply critical security patches and hotfixes to the Operating System. To enter the Master-Admin mode of administration, the username as master_admin at the Password Logon Screen may be entered.

In some embodiments, the Master-Admin mode of administration is normally not used to add/delete/modify Users through the System Control Panel or to modify the Windows Registry. This mode is also not normally used to modify any configuration parameters or to modify User-specific files/folders on disk as this may affect the stability of the system. To configure the System and manage users, the spe-admin mode may be used. In order to change the master-admin or spe-admin passwords, the user may use the spe-admin mode of administration.

In some embodiments, if this is the first time that this box is being booted, then a message may appear indicating that the user may have to configure the system before proceeding further. Pressing "OK" may bring up the System Configuration menu, where the user may be prompted to enter certain Mandatory information needed for the system to be fully functional.

FIG. 7 illustrates an example Database Settings screen. To begin configuration of the STB the user first specifies and enters the location of the user profile database. Pressing OK at the Configure System screen may bring this page to the forefront. In some embodiments, the database settings tab may have the following fields:

IP Address: This is the address of the SQL database where the user profiles are stored. The correct IP Address of the server where the database is located should entered. Whenever a user attempts to log in to the system, his/her credentials may be verified against this database.

Database name: This is the name of the database running on the server, where the user profiles are stored.

User name: The username for the SQL database where the user credentials are stored.

Password: The correct password for accessing the database server.

Confirm password: The server password again, only for verification.

After entering all the information, clicking the "Save Settings" button causes the database settings to be saved into the STB. To check if the settings entered are correct, the "Check Connection" button may be used. "Check Connection" checks the connection for the current settings already stored into the system.

An STB Server Settings tab leads to a screen that allows the user to enter the address of the STB server from where the clips may be transferred into the box.

The FTP Account Details specifies the FTP Username and FTP Password used by the FTP Server to login to the STB in order to transfer media clips to the STB. The STB may be pre-configured with the default FTP Username and FTP password. The FTP Username and Password may be changed for additional security.

After configuring these Mandatory settings, the user may choose to exit and return later to configure the other system parameters.

A Main Menu may then be displayed. The user can change the system configuration parameters at any later stage by launching the Configuration Screens from the Main Menu. If this is not the first time that the user is logging in, then the Main Menu may be the first screen which appears. This menu allows the user to manage users, manage folders, launch the Configuration menu and restart the system.

Figure 8:
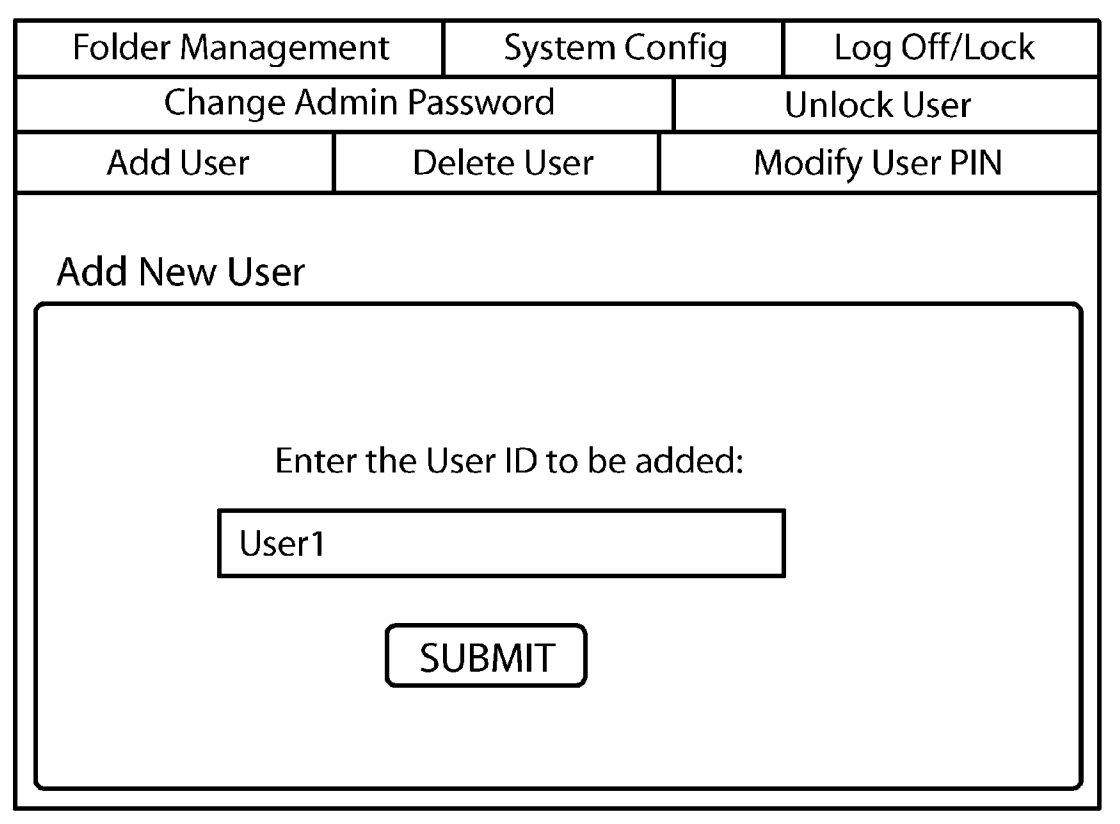

FIG. 8 illustrates an example screen for "Add New User". Clicking on the "Add User" tab provides a screen for configuring a new user. The username of the user to be configured for this system may be entered. The user's ID may be required to be present in the database before it can be added. If the user tries to add a user Id which is not present in the database then an error message may be displayed. A limited number of users may be configured to use the system. If more than the limited number of users have already been configured to use the system, then the system may not allow the user to add any more users. In this case, a message may be displayed "Maximum allowable users present. Please delete some user to add a new user." Upon successfully adding the user, the message may change to "User added successfully".

A "Delete User" tab may be included to delete an existing user. This option may be enabled only if one or more users have been added to the system. If one or more users have been configured, then the usernames of all added users are displayed in a drop-down list. To delete any user, the username may be selected from the drop-down list and the "Delete" button pressed. Deleting the user may delete all media clips associated with the user. Deleting the user on the STB may not delete the user from the STB Server Database.

A "Modify User PIN" tab may be included to lead to a screen for changing/modifying user's PIN. This option may be enabled only if one or more user has been added to the system. If the user forgets the PIN and requests to reset it then this can be achieved using this screen.

An "Unlock User" tab may be included to retrieve a user's lock status. If the user enters the incorrect PIN on five consecutive occasions at the PIN access screen, the STB may lock itself and the screen may read "The user account has been locked". If the user account has been locked, the Administrator can log into the system and unlock the user.

A "Change Admin Password" tab may be included. To change the administrator password entered at the password logon screen, click on the Change Admin Password tab. Select the type of administrator whose password is to be changed by entering his username (For example, enter master_admin to change the password for master-admin for this box).

Figure 9:
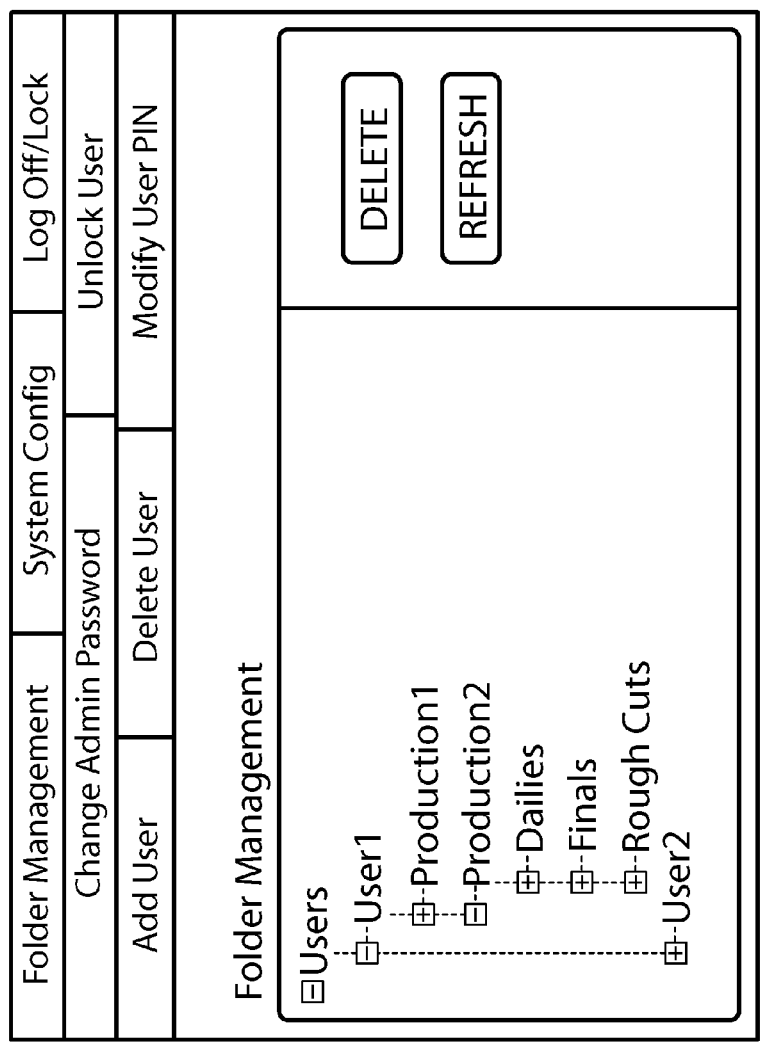

FIG. 9 illustrates an example screen for "Folder Management". This screen allows the user to delete the folders associated with the currently configured users. The user can delete entire Productions, corresponding Dailies/Cuts/Cine-SHARE, or playlists for specific dates.

To manage the user's folders, the Folder Management tab may be selected. The user may see a single node named "Users". The "+" may be clicked to expand the node. The usernames of all the users present on the system may be displayed. Expanding the node for any one of the users further may display the set of Productions for which clips are present on disk for this user.

To delete a playlist, for a production type, the node may be expanded until the desired playlist is displayed. A node may be selected and the delete button pressed. Playlist nodes may be displayed using the display names of the associated playlists.

Figure 10:
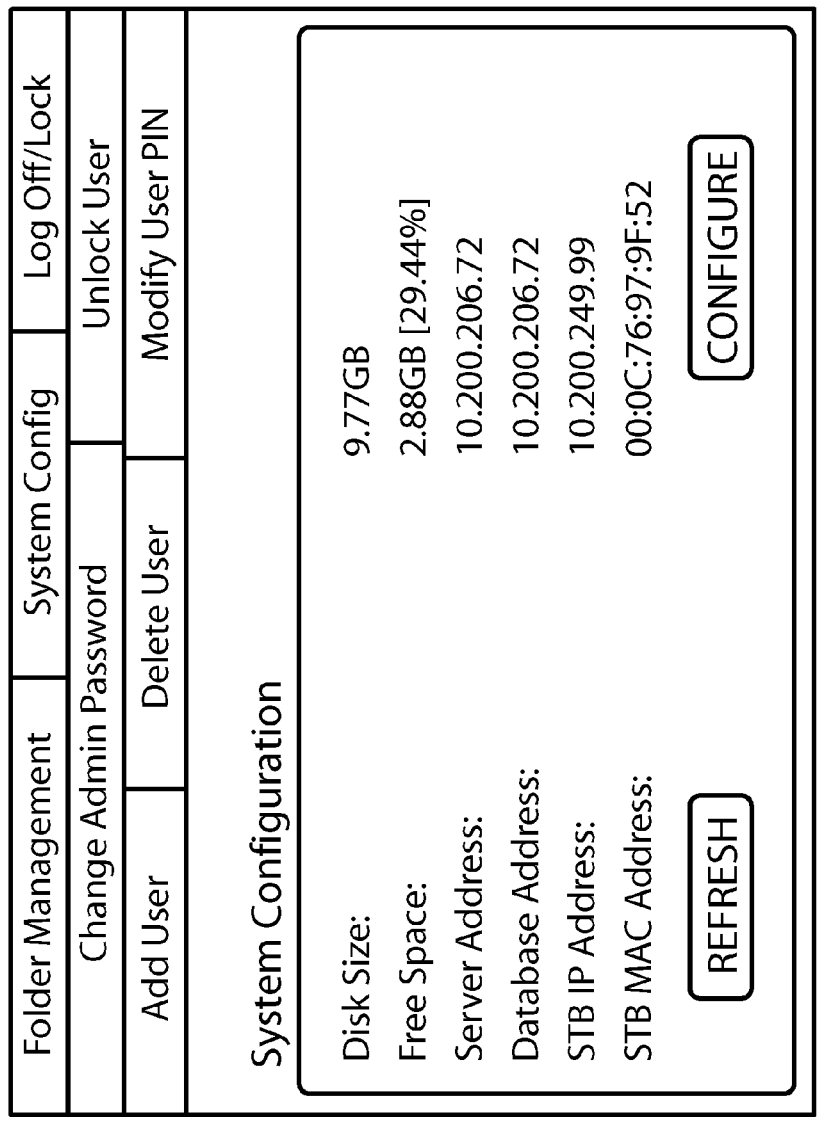

FIG. 10 illustrates an example screen for "System Configuration". This screen displays certain system specific information and allows the user to change the system configuration by launching the Configuration Menu. Various items may be displayed, such as for example:

Disk Size: The total storage capacity of the disk present in this STB.

Free Space: The amount of free space present on the disk expressed in bytes (GB or MB) and as a percentage of the total disk size.

Server Address: The address of the STB Server where the media clips are stored as configured. If this value is blank, then no STB Server has been configured.

Database Address: The address of the SQL database server where the user credentials are stored. The users may be authenticated against this database server.

IP Address: The IP address of this STB. If the STB is not connected to the network, this value is displayed as "Network disconnected".

MAC Address: The unique MAC Address of this STB.

The "Configure" button may be selected to bring up the System Configuration Menu to change the system configuration. Clicking on the "Refresh" button retrieves all the information and refreshes the display.

A "Log Off/Restart" tab may be included for Locking, Logging Off and Restarting. The respective buttons may be clicked to lock, log off or restart the STB.

The System Configuration Menu allows the user to set certain system specific parameters. The Mandatory Settings have already been described in the sections above. In the following sections, some of the other settings will be explained.

Figure 11:
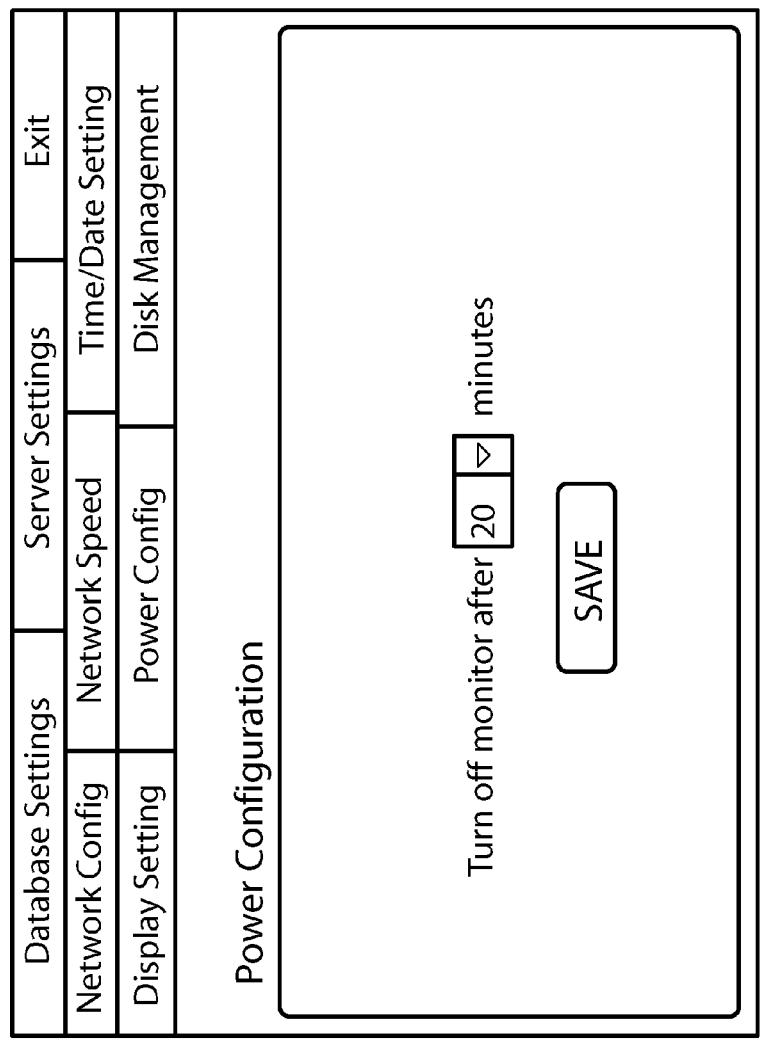

FIG. 11 illustrates an example screen for "Power Configuration". The STB can be configured to automatically turn off the hard disks and the monitor after a certain time period of inactivity in order to save power. This screen may allow the user to set the time period of inactivity from the user after which the STB hard disk and monitor may be turned off. The hard disk and the monitor may not be shut down while a media clip is being played. Pressing any remote control key or moving the mouse may get the STB out of the power saving mode.

A "Time and Date Setting" tab may be included. This screen allows the user to set the system date and time.

A "Network Config" tab may be included. "Network Configuration" screens allows the user to set the network type, such as for example to either DHCP or Static IP address. By default the value may be set to DHCP. The user may specify a static IP address.

A "Network Speed" tab may be included. This screen allows the user to select the network speed for this STB. Selecting High Speed may transfer high resolution clips to this STB while selecting Low Speed may transfer low resolution clips and so forth.

A "Disk Management" tab may be included. The Disk Management screen may allow the user to configure two parameters:

Disk Usage Limit: The Disk Usage Limit expresses, as a percentage, the amount of disk space to be used to store media clips. For example, if the disk usage limit is set to 70%, then 70% of the disk may be used to store media clips. If the amount of disk space used by the clips exceeds this value, then some of the old clips may be deleted automatically from the disk to restore the disk usage limit to this value.

Media Clip Availability Duration: This is the minimum number of days for which the clip cannot be automatically deleted from the disk. If the clip has been present on the STB for these many days or more, it becomes a candidate for deletion and may be automatically deleted once the disk usage ratio exceeds the set limit. If the clip has been present on the STB for a lesser number of days than the Media Clip Availability Duration it cannot be deleted.

A "Display Settings" tab and respective feature may be included. This screen allows the user to set the type of output for this STB. It allows for two options: S-Video OR Composite and Component.

An "Exit" tab may be included to exit the System Configuration Menu and return to the main menu.

In some embodiments, the STB may provide the user the ability to connect is to the STB Server using a Virtual Private Network (VPN) connection. Using this VPN Connection, the user can log into the box, receive and play media content from the comfort of his home.

FIG. 12 illustrates an example screen for VPN Settings. Before the VPN Connection can be established, the STB may have to be configured for the VPN Connection. To Configure the VPN Connection, the VPN Setup tab may be selected from the System Configuration Menu. In the first field titled "Enter the VPN Connection Name", the name the user wishes to identify this VPN Connection with may be entered. In the second field titled "Enter the VPN Server Address", the IP address of the VPN server to which the user wishes to connect may be entered.

Once the VPN Connection is set up, the VPN Connection may be enabled or disabled as and when needed. If the VPN Connection is enabled, then the STB may try to automatically dial into the VPN Server and establish the VPN Connection on startup. If the VPN Connection is disabled, the STB may not establish any VPN connection on startup.

To Enable/Disable the Connection, the ENABLE/DISABLE button on the VPN Setup Page may be selected. The current VPN Status may be displayed at the bottom of the screen as "VPN Connection is currently Enabled" if the VPN Connection is enabled and vice versa.

For Entering the VPN Credentials, on restarting the STB, the STB may try to automatically establish the VPN Connection if it has been enabled. At this time the user's VPN Username and Password may be needed and may be prompted at the login screen.

For Modifying the VPN Connection Settings, the VPN Setup can be modified at any time by selecting the VPN Setup tab from the System Configuration Menu and entering the new VPN details. In some embodiments, however, that at any instant only one VPN Connection may be configured, therefore entering a new VPN Connection setting may overwrite any existing settings in use.

A "Log Off/Restart" tab and respective feature may be included for Restarting the STB after VPN Setup. The STB may need to be restarted every time the VPN Connection is setup, or the VPN Connection is enabled/disabled.

Figure 13:
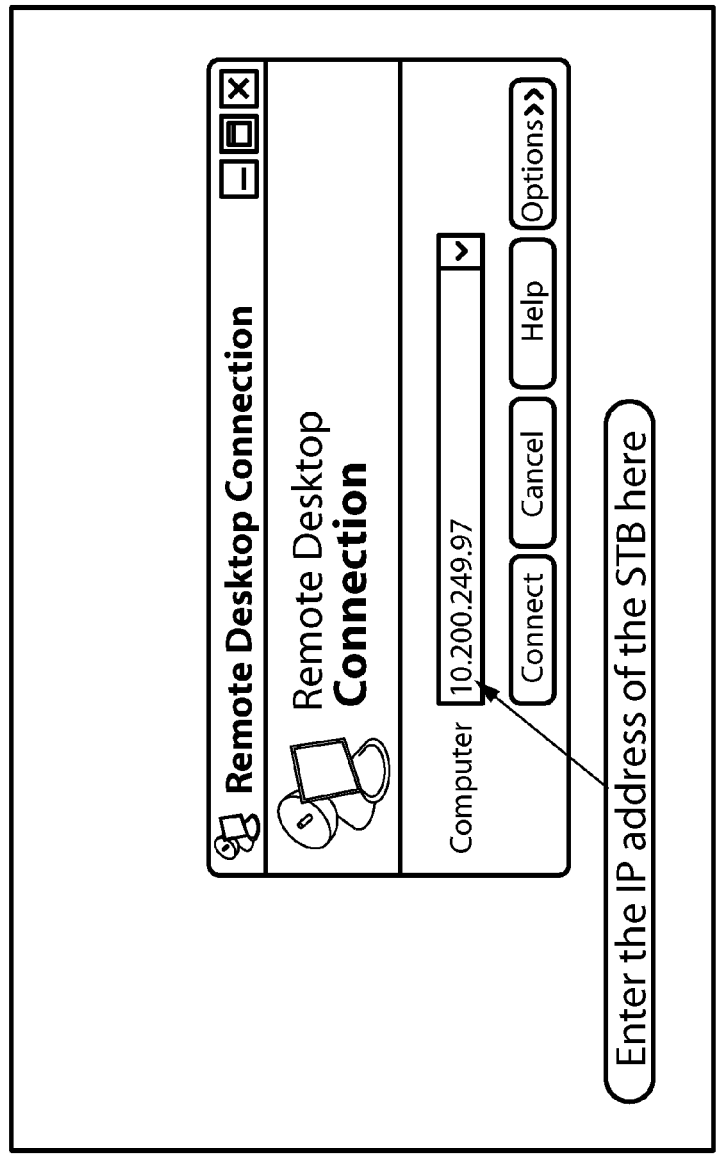

As mentioned above, in some embodiments the STB provides the administrator with the ability to configure it remotely from any other machine. When logging into the STB remotely, a Remote Desktop Connection window may appear. As shown in FIG. 13, enter the IP address of the STB the user wish to connect to and click Connect. The user may be prompted for the administrator user name and password. The appropriate username and password may be entered, based on the mode of administration desired.

If the user has logged in as spe-admin, then the STB may be configured using the Administrator screens as described in the previous sections. Once the STB configuration is complete, the EXIT tab may be selected. If the user have logged in as master-admin, then the System Updates/Hotfixes may be applied as desired.

An STB User Application can be run in admin mode for testing purposes by clicking the "STB User Application" icon on the desktop to launch the User Application. The STB Applications may include three separate modules:

The STB User Application: This is the basic application which appears when the user logs into the system. This application allows the user to browse through the productions present on the STB and play media content.

The STB Admin Application: This is the application which appears when the administrator logs in as spe admin.

The STB Logon Interface/PIN Access Console: This is the application which appears when the STB Boots up. This application displays the PIN access screens and handles the login process.

As mentioned above, in some embodiments, the STB may include a user-friendly Graphic User Interface (GUI) designed specifically for intuitive operation of the Set Top Box (STB). Access to the STB may be restricted to the specific user configured by the STB Digital Dailies Administrator. The user will only have access to those media clips (Digitized Production Dailies and Rough Cuts) designated to him/her by Administrator. These media clips are stored locally on a hard-disk and may be protected using Digital Rights Management (DRM) technology.

FIGS. 14-26 illustrate screen shots of an example interface that may be used with the system 300 (FIG. 3) for an embodiment of the set-top box and Intranet store and forward scenario. As an initial example, in the screen shot shown in FIG. 17, the user may choose to view "CineSHARE", "Dailies", "Finals", or "Rough Cuts" for Production No. 2. This illustrates that the system may be used for viewing both raw footage, such as dailies, as well as edited footage, such as rough cuts, final cuts, is etc. In the screen shot shown in FIG. 20, the user may choose to view a particular scene, take, or camera viewpoint for Dailies for Production No. 2.

More specifically, in some embodiments the functions of the STB may be controlled by the keys on a remote control. The remote control may be broken down into these different sections: Numeric Keys, Navigation Keys, Function Keys, Media Player Keys and Special Keys.

Figure 14:
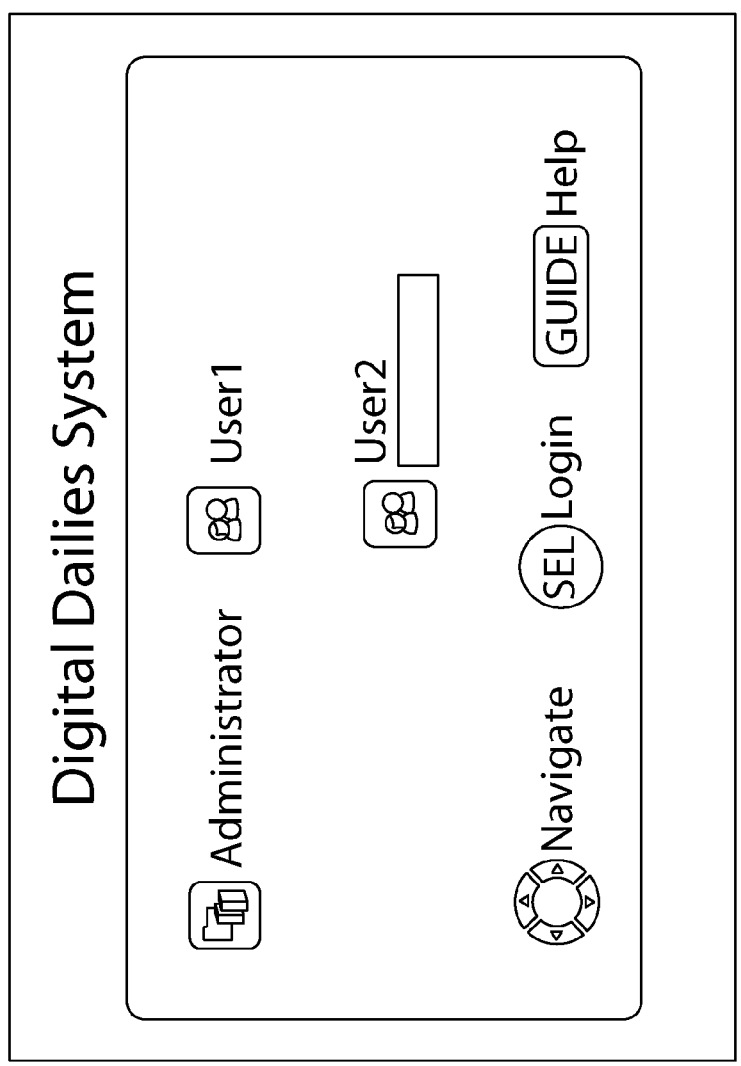
FIGS. 14, 15, 16, 17, 18, 19, 20, 21, 22, 23, 24, 25 and 26 are screen shots illustrating an example user interface that may be used with a set-top box in accordance with an embodiment of the present invention.
Figure 15:
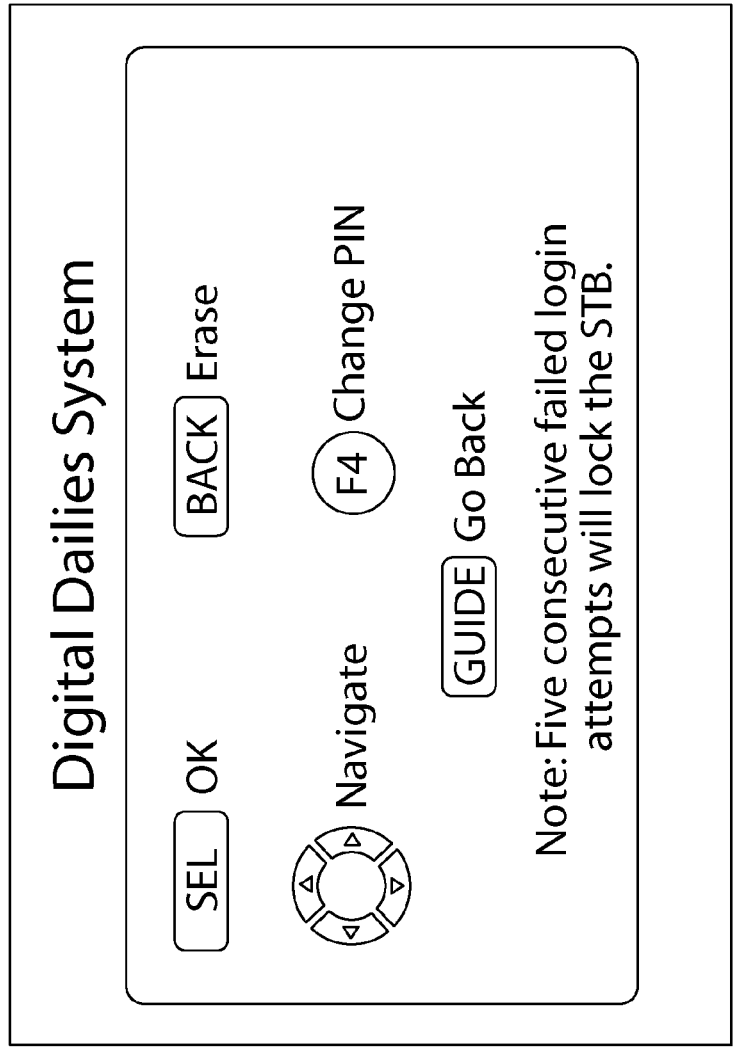

When the STB is switched on, a PIN access screen may appear. Based on the number of users configured to use the system, the login screen may change. FIG. 14 displays the PIN access screen when two users have been configured to use the system. In this case, use the up and down arrow keys (in addition to the left and right arrow keys) on the remote control may be used to choose a username. The GUIDE button on the remote may be pressed to see the help screen as shown in FIG. 15.

When logged in, a list of all the production names will appear. If there is no production present on the STB, then the screen appears without any production names. If productions are present in the STB, the "Productions" screen appears and all the production names are shown on the screen.

Figure 16:
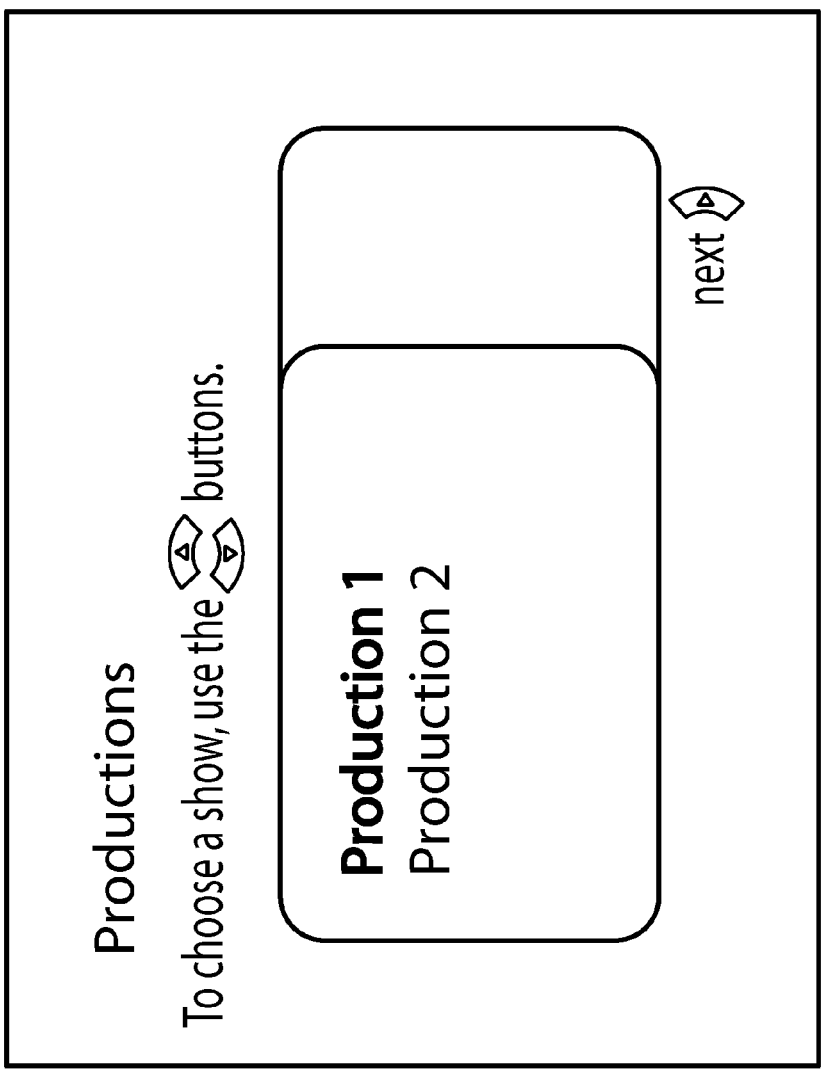

FIG. 16 illustrates an example of a listing of productions present in the STB. Each "Productions" screen shows up to four productions. If there are more than four productions to choose from then a scroll arrow will appear at the bottom of the list. The navigation buttons may be used to advance to the next page of productions.

The user can choose different productions and scroll up and down through the selections by pressing the up and down arrows. The respective production will be highlighted.

Pressing next arrow button or the SELECT button on the highlighted production name takes the user to the screen showing the selected productions' "Dailies," "Rough Cuts," "Finals" and "CineSHARE"; depending on which of these are present on the STB. Pressing the next arrow button on "Production 2" shows the Production types present for that production.

Figure 17:
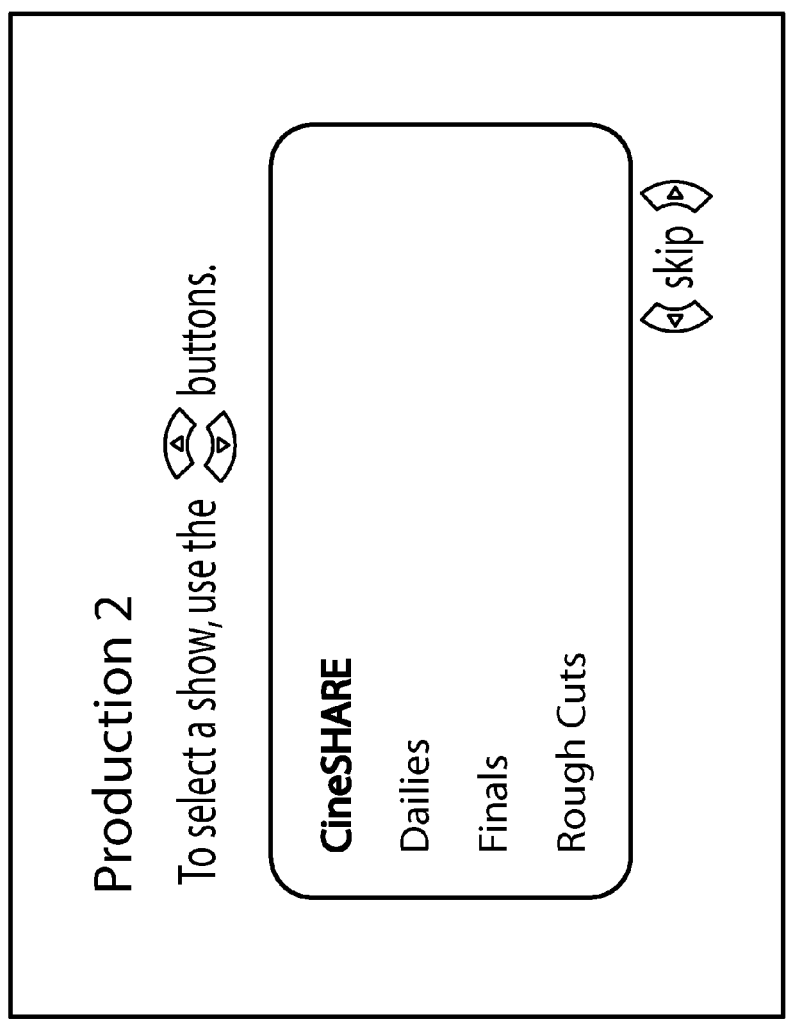
Figure 18:

FIG. 17 illustrates an example of a listing of the Production types. "Production 2" is displayed at the top of the screen. The Dailies, Rough cuts, Finals and CineSHARE shown below belong to the specified "Production 2". Pressing the back arrow button takes the user back to the productions screen. On this "Production 2" screen the user can select Dailies, Rough cuts, Finals or CineSHARE by pressing the up or down arrows.

Towards the lower right corner of the screen "skip" is displayed. Here the user can use the left and right arrows to advance to the next screen or backtrack to the previous screen.

Pressing the next arrow button on "Rough Cuts" or "Finals" advances to the "Dates" screen. On this screen the date of each prospective cut is displayed. Selecting "Rough Cuts" for "Production 2" shows the "Dates" screen illustrated in FIG. 18. This shows the list of dates present for the "Rough Cuts" for "Production 2." The Corresponding day of the date is also shown in the list, followed by a short description of the cut. Various dates can be selected by using the up and down arrow.

Figure 19:
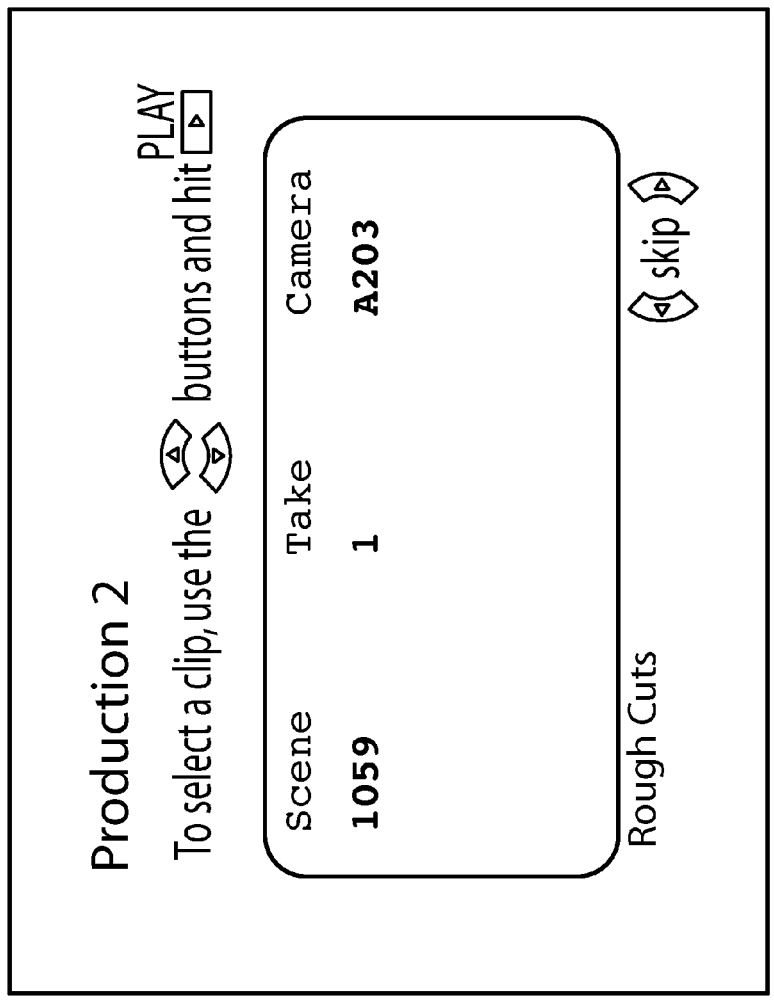
Figure 20:
Figure 21:
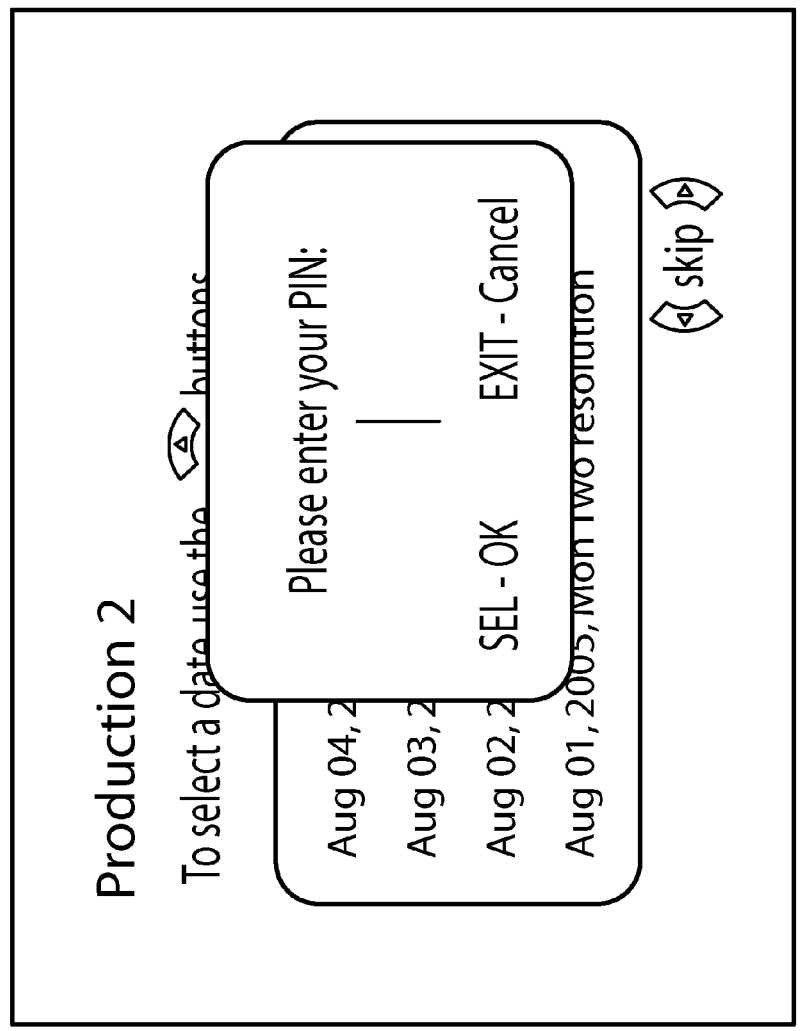

Pressing the next arrow button on the desired date displays all the clips present for that date. For example, pressing the next arrow button on "Aug. 2, 2005, Tue Multi Transfer" shows the list of clips specifically for "Aug. 2, 2005, Tue Multi Transfer", as illustrated in FIG. 19. If there is more than one cut per shoot date, the user will see multiple entries for the same date. In such a case, the description may be used to differentiate between these cuts. Each Clip displays a different "Scene", "Take" and "Camera" subtitle. If no media clips are present on the STB for the selected production, then a message "No media clips present" may be displayed.

Pressing the PLAY button on a highlighted clip starts playing that clip. Upon pressing PLAY, if a license is not present for that clip the request goes to server for that license. The Clip starts playing if the license is acquired. If the license cannot be acquired, "Error Acquiring License" may be displayed.

Pressing the next arrow button on "Dailies" shows the list of "Dates" for which dailies are present on the STB. Various dates may be selected by using the up and down arrow buttons. Upon pressing the next arrow button on the desired date, the STB displays all the clips present for that date. Pressing the next arrow button on "Aug. 2, 2005, Tue 10008.flx" shows the list of clips shown in FIG. 20. Clips with different "Scene", "Take" and "Camera" are shown in the list. Note that the small down button is shown at the bottom of the list. There are more clips for date "29 Sep. 2005," which can be viewed by pressing NEXT or by scrolling down with the arrow keys.

Up and down arrow buttons are used to select different clips. Pressing the PLAY button on the highlighted clip starts playing that clip.

Pressing the next arrow button on "CineSHARE" shows the list of "Dates" for which CineSHARE clips are present on the STB. Similar procedures may be used to select and play those clips.

In some embodiments, certain productions may prompt for the user PIN in order to proceed. Pressing Next from the "Aug. 4, 2005, Thu Single Transfer" displays a PIN Access screen, shown in FIG. 21. Enter the PIN (the same PIN used to login) at this screen to continue. A number of consecutive incorrect attempts may log the user off the system. Once the user has chosen a particular clip for playback, the clip starts playing.

The playback controls one the remote control, such as fast forward, rewind, pause, etc., may be used to control a clip that is playing.

In some embodiments the user interface may include an option that allows the user to view the content in its native resolution. The native resolution is the resolution in which the content was originally shot. For example, if the content was shot in 720×480, then the native resolution is 720×480.

This option is useful because in some embodiments the system may change the aspect ratio of the picture to fill the screen of the display, which allows for full screen viewing of the content. However, the user viewing the content, such as an executive or director, may want to view the content in the resolution in which it was originally shot, i.e. its native resolution. The user may wish to view the content in its native resolution to see if any information is lost or if anything is getting cut out of the scene when the aspect ratio is changed to fill the screen. Thus, in some embodiments the user interface may include an option that allows the user to view the content in its native resolution. Executives and directors sometimes like to view the content in its native resolution, and with this feature they can simply press a button or the like and view the content in its native resolution. In some embodiments, the option to view the content in its native resolution may be similar to an underscan option.

Figure 22:
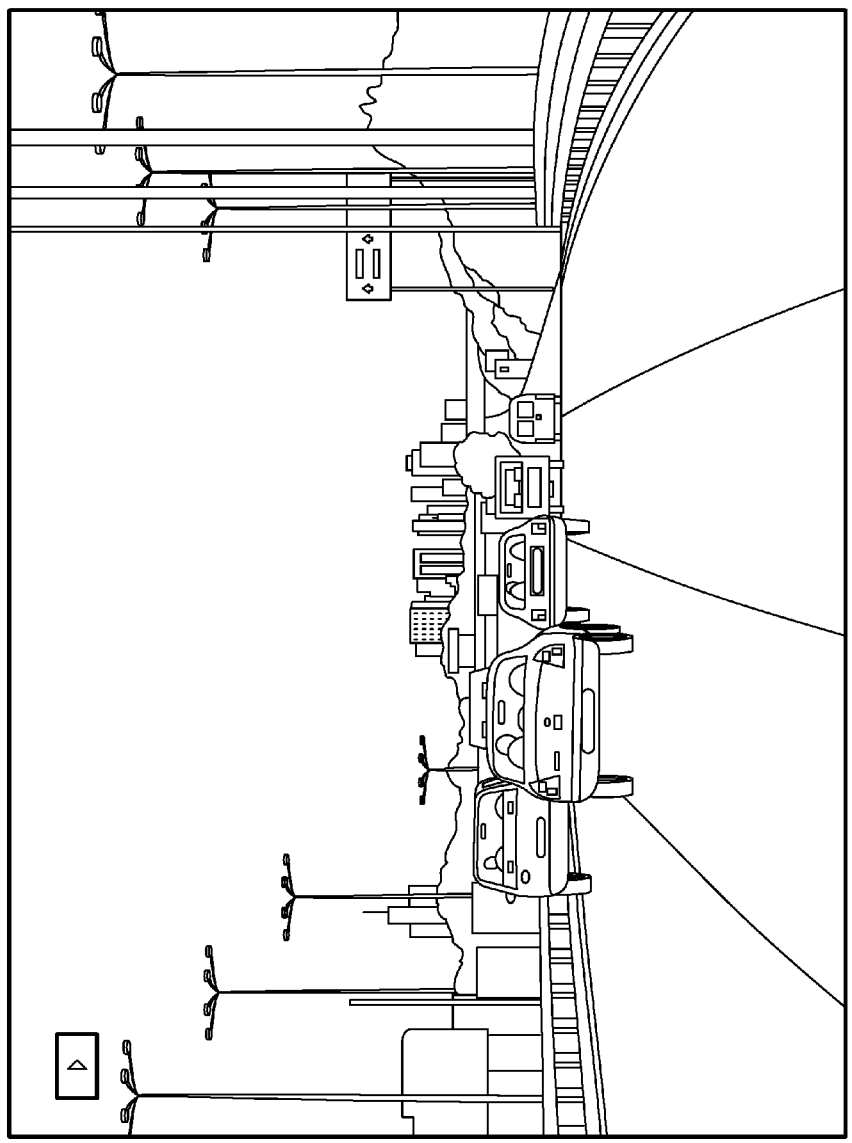
Figure 23:
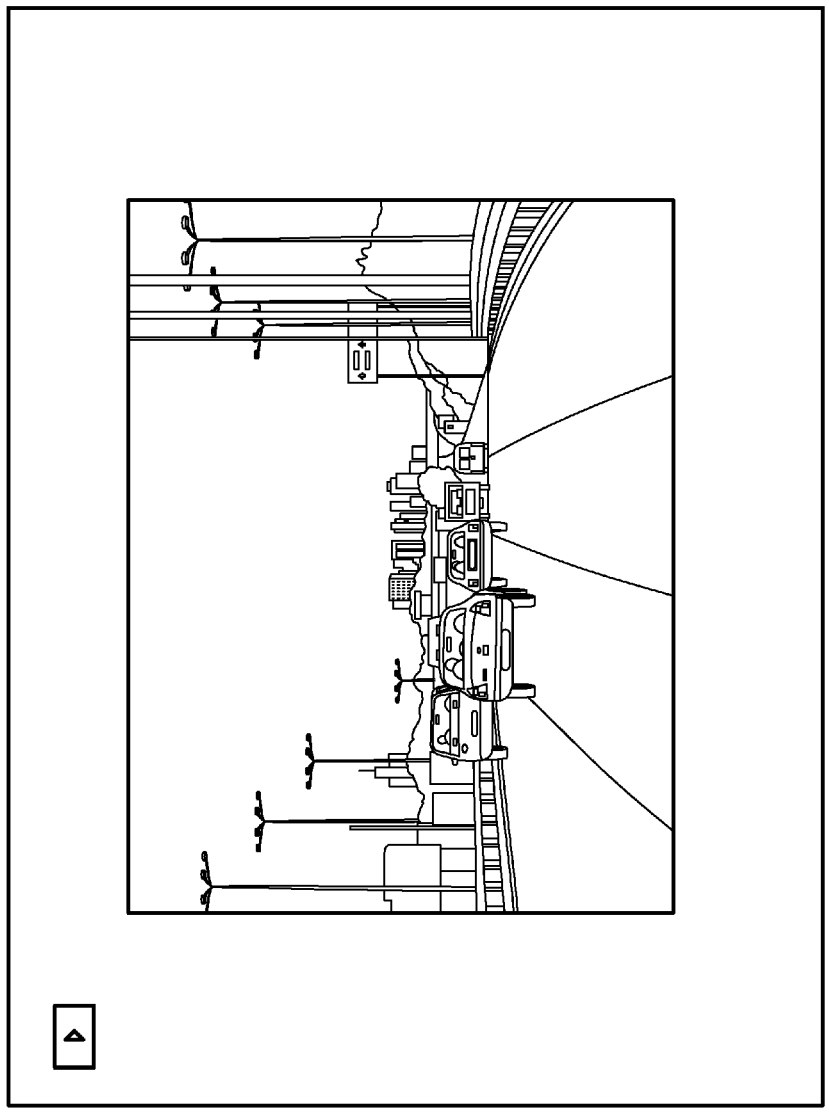

Thus, in normal mode the video may be displayed in full screen mode, as illustrated in FIG. 22. However the user may play the video in its original/native resolution, as illustrated in FIG. 23. Pressing a designated button may toggle from actual video size to full screen mode and vice versa. Toggling video size does not affect playback position.

Figure 24:
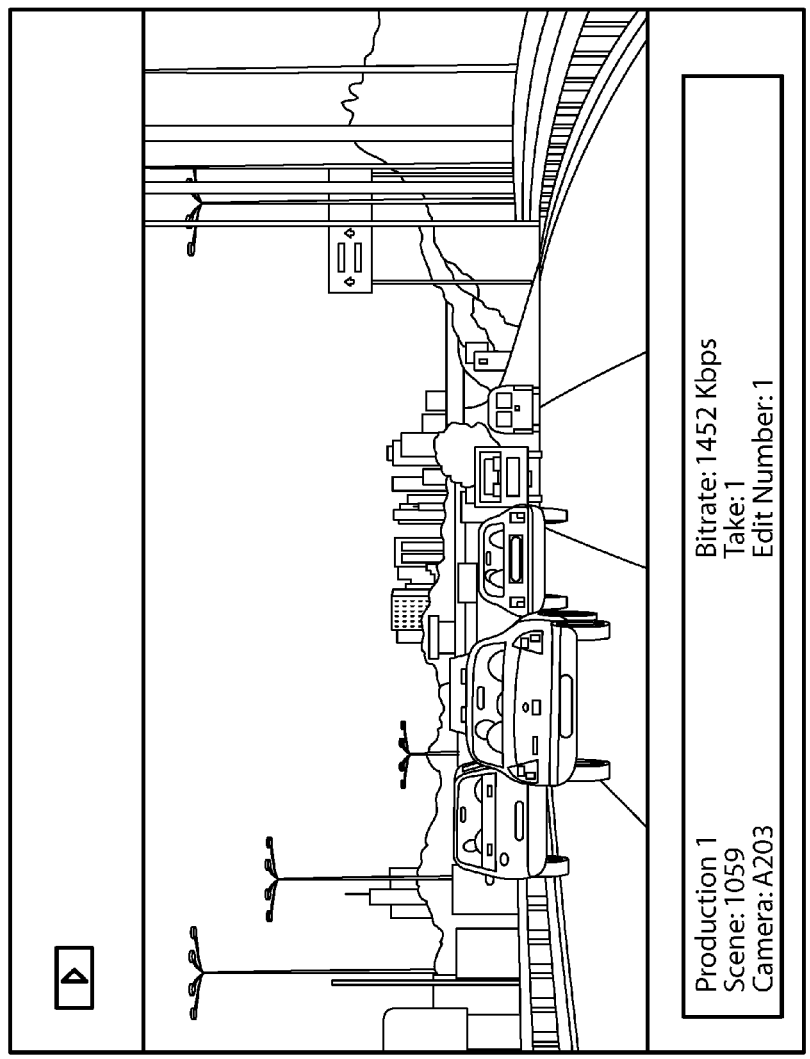

To display information about the clip being played, the INFO button may be pressed. The INFO display shows the clip's name, the date; scene, take, camera information, and the bit rate, as illustrated in FIG. 24.

Figure 25:
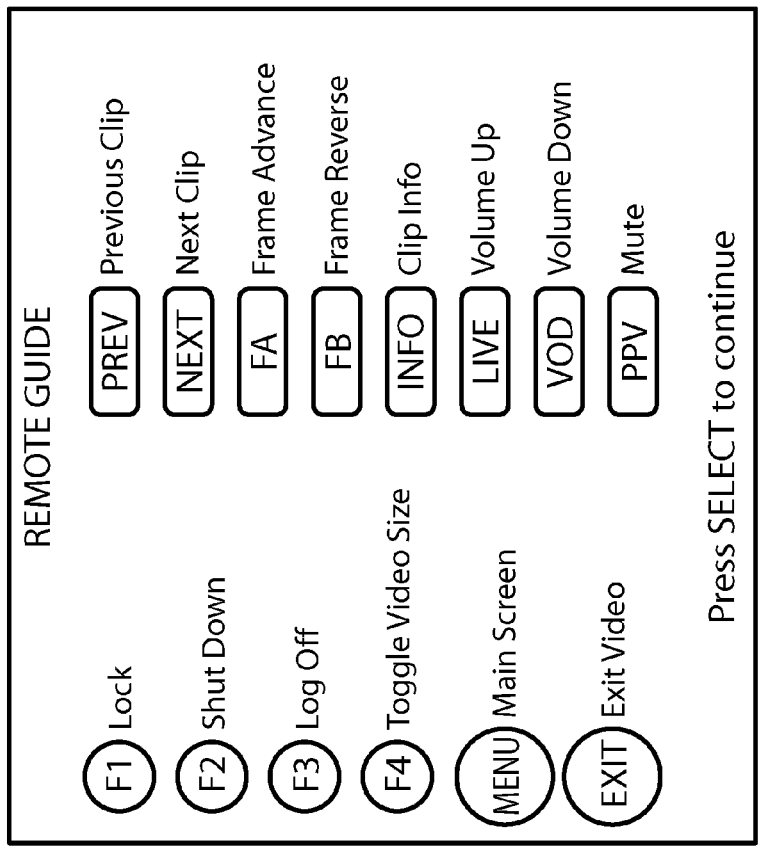

The GUIDE button may be pressed to display the remote control key mapping guide, as illustrated in FIG. 25. This "Guide Screen" displays a list of the remote keys and their corresponding functions. This display can be launched from any point, even when the clip is not being played. Depending upon the key pressed the corresponding icons for stop, play, pause, fast forward, rewind, frame advance and frame back may be shown at the top left of the screen.

In some embodiments the user may lock, shutdown and logoff the STB at any time by pressing F1, F2 and F3 respectively, or some other keys.

In some embodiments, the STB provides a mechanism which allows users to log in to the STB, receive and play media content from the comfort of their homes, through a simple VPN Connection. By setting up the VPN connection, the STB can be used remotely from the user's homes.

When the VPN-Enabled STB is started up, the STB will automatically try to establish the VPN connection. However, if this is the first time that the connection is being established, the STB may display an "Incorrect VPN Credentials" screen.

The box may display a message asking whether a keyboard is present. If the user does not have a keyboard attached, then pressing the SEL key on the remote may choose the "NO" option and present a keyboard layout on the screen.

In some embodiments, an Administrator can remotely log in to the STB. If the administrator logs in remotely then the message showing "Administrator has remotely logged in" may appear. While an administrator is remotely logged in the user may not be able to use control their set top box. The remote administrator may then restart the system to show the PIN access screen again.

As mentioned above, some embodiments of a GUI for the set-top box (STB) may include a screen where a video item of content may be selected. Once the video item has been viewed, the item may be flagged as viewed. The item selected may also be flagged for review. Finally, the selected item may also be flagged for deletion.

Figure 26:
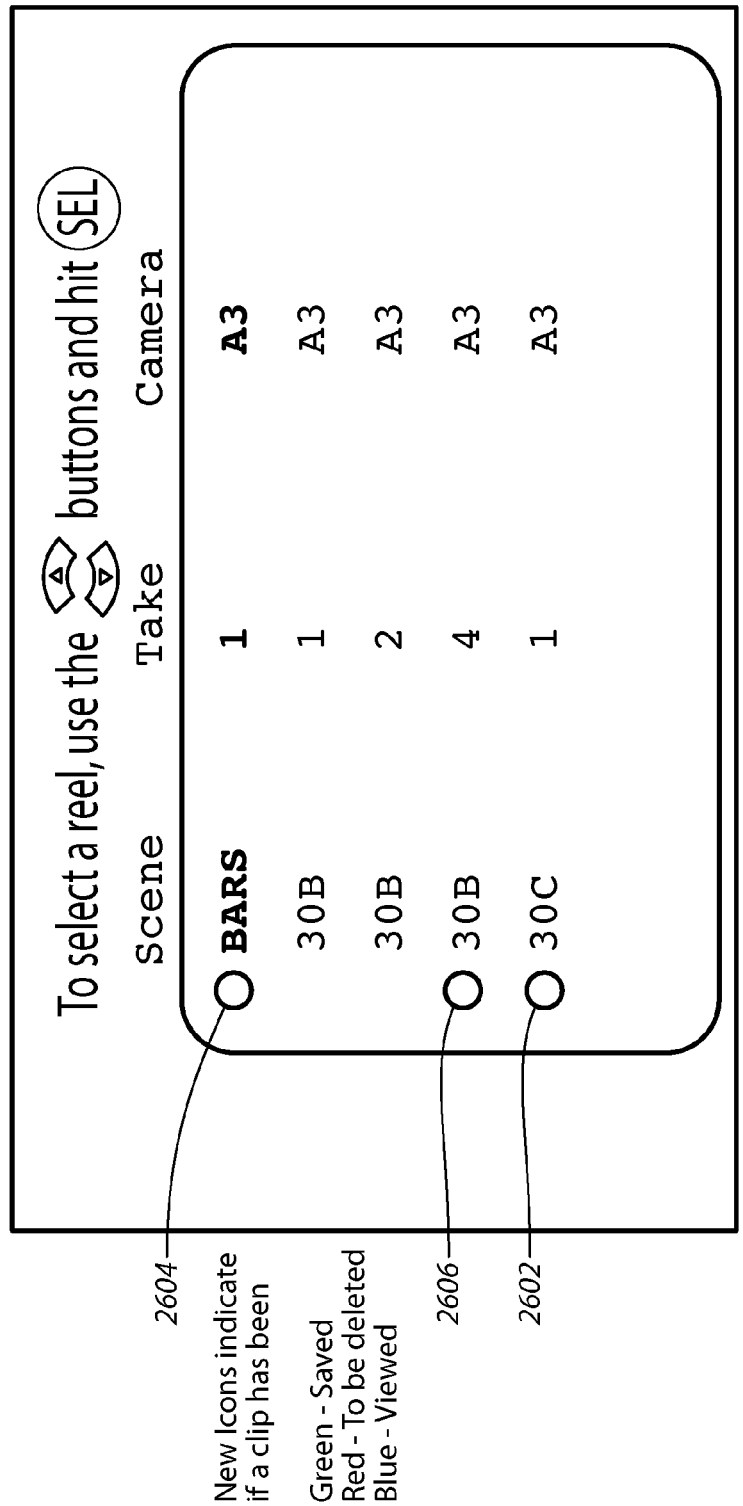

Referring to FIG. 26, there is illustrated a screen shot showing an example implementation of this feature in accordance with an embodiment of the present invention. The screen displays a listing of Clips and the corresponding "Scene", "Take" and "Camera" for each clip. This feature relates to the review and delete functionality whereby the end-user can locally (via the client device) choose to flag a video clip for review, or deletion.

For example, in one embodiment a colored dot 2602 may be placed next to a video clip that has been viewed. In one embodiment the colored dot 2602 may be blue so that the blue color references a video clip which has been viewed. Another colored dot 2604 may be placed by the user next to a video clip for review. In one embodiment the colored dot 2604 may be green so that the green color indicates a user-triggered flag which marks the video clip for review. And finally, a colored dot 2606 may be placed by the user next to a video clip that is to be deleted from the local STB. In one embodiment the colored dot 2606 may be red so that the red color indicates a user-triggered flag which marks the video clip for deletion from the local STB. Thus, in some embodiments colored dots may be used to mark the clips, but it should be understood that any type or shape of mark or other visible indication may be used to mark the clips.

Thus, in some embodiments the client device, such as an STB, is capable of allowing the client device user to mark one or more portions of the received digital video data for review, or deletion. This allows the user to locally flag one or more portions of the received digital video data (such as one or more clips) for review, or deletion. Furthermore, as has been mentioned above, in some embodiments the client device is capable of automatically tracking and expiring one or more portions of the digital video data that is provided to the client device based on production priorities.

Thus, embodiments of the present invention may provide the benefits of eliminating or avoiding physical media (e.g. DVDs) for production review (which may improve speed and cost by reducing media duplication, distribution and associated labor costs), provide higher content security using, for example, digital rights management (DRM), content watermarking, secure virtual private network (VPN) networking technology, etc., provide quicker delivery of dailies, cuts and finals, reduce shipping and handling costs, and automatically track and expire content.

Additional variations and implementations are also possible. For example, while some examples discussed above refer to movies and television production, other content could be used as well, examples including, but not limited to, motion picture production, marketing and advertising production, radio production, webcast production, casting production, and sports production.

Additional variations of the digital media being reviewed are also possible. For example, while some examples discussed above refer to video content, other forms of digital media could be used as well, examples including, but not limited to, digital audio (e.g. MP3, WMA), digital images (e.g. jpg, tiff, png), digital documents (e.g. PDFs, Word Processing documents).

In some embodiments, one example implementation may include one or more programmable processors and corresponding computer system components to store and execute computer instructions, such as to provide the server, set-top box, and/or digital content distribution and streaming between client and server. In some embodiments the set-top box hardware and/or software may comprise a personal computer (PC) based system. In some embodiments the streaming version may comprise a web-based system.

Figure 27:
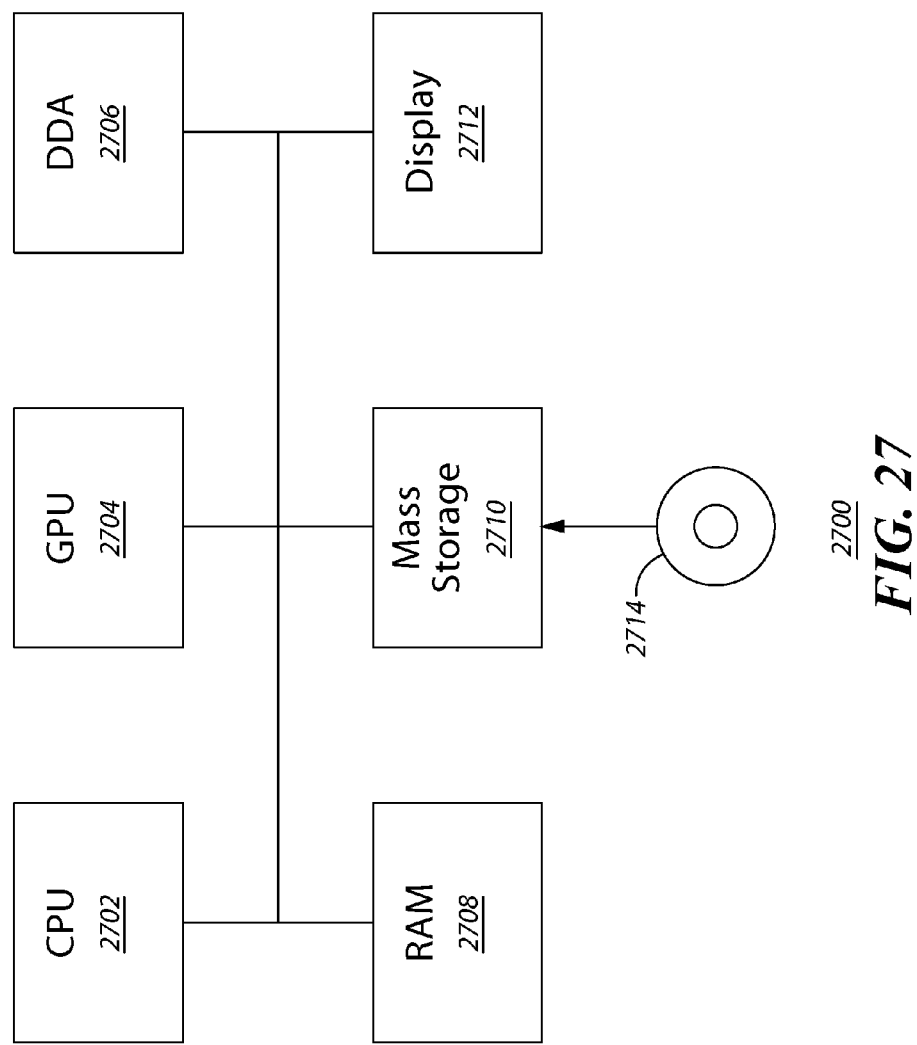
FIG. 27 is a block diagram illustrating a processor based system that may be used to run, implement and/or execute the methods shown and described herein in accordance with embodiments of the present invention.

Referring to FIG. 27, there is illustrated an example system 2700 that may be used in some embodiments for implementing, running and/or executing any of the methods and/or techniques described herein. The methods and techniques described herein may be utilized, implemented and/or run on many different types of computers, servers, graphics workstations, televisions, entertainment systems, video game systems, DVD players, DVRs, media players, home servers, video game consoles, hand-held devices and phones, and the like. Such devices may use a system such as the system 2700 or a similar or different system. In some embodiments, the facilities, server, set-top box, and client devices described above may use a system such as the system 2700 or a similar or different system. Use of the system 2700, however, is certainly not required.

By way of example, the system 2700 may include, but is not required to include, a central processing unit (CPU) 2702, a graphics processing unit (GPU) 2704, digital differential analysis (DDA) hardware 2706, a random access memory (RAM) 2708, and a mass storage unit 2710, such as a disk drive. Thus, in some embodiments the system 2700 comprises a processor based system. The system 2700 may be coupled to, or integrated with, a display 2712, such as for example any type of display.

The CPU 2702 and/or GPU 2704 may be used to execute or assist in executing the steps of the methods and techniques described herein, and various program content, images, footage, scenes, dailies, cuts, etc., may be rendered on the display 2712. Removable storage media 2714 may optionally be used with the mass storage unit 2710, which may be used for storing code that implements the methods, techniques and/or features described herein. However, any of the storage devices, such as the RAM 2708 or mass storage unit 2710, may be used for storing such code. Either all or a portion of the system 2700 may be embodied in any type of device, such as for example a television, computer, server, video game console or system, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A system for facilitating automated digital workflow, the system comprising:
    a first set top client device, located at a first user premises, for receiving and storing digital video data that is automatically sent from a server associated with a post house or postproduction facility in a nonstreaming manner without any interaction by users at the first set top client device, wherein the first user premises is located remotely from the server;
    a second set top client device, located at a second user premises, for receiving and storing the digital video data that is automatically sent from the server in a nonstreaming manner without any interaction by users at the second set top client device, wherein the second user premises is located remotely from the server and the first user premises;
    a computer, located at a third user premises, operated by an administrator associated with the post house or post production facility, for providing the administrator with an ability to remotely log-in to each of the first and second set top client devices located at the first and second user premises respectively and conduct remote administration on the respective set top client device, wherein the third user premises is located remotely from the first user premises and the second user premises; and
    a network for communicably coupling the post house or post production facility, the server, the first set top client device, the second set top client device, and the computer;
    wherein, the remote administration is conducted by the administrator, using the computer located at the third premises, on the respective set top client device and is specific to the respective set top client device using an administration graphical user interface (GUI);
    wherein the remote administration includes an ability for the administrator, using the administration GUI, to remotely create new users that are authorized to access digital video data on the respective set top client device, remotely modify users that are authorized to access the digital video data on the respective set top client device, remotely assign administrative rights to users on the respective set top client device, remotely create new productions and modify productions on the respective set top client device, and remotely administer the digital video data that is provided to the respective set top client device, which includes an ability to remotely delete one or more portions of the digital video data;
    wherein access to the digital video data on the respective client device is restricted to only specific users who have specifically been designated, by the administrator, with access authorization at that respective set top client device to the digital video data;
    wherein the post house or postproduction facility is for establishing and uploading to the server the digital video data including images shot in relation to making of content.

2. A system in accordance with claim 1, wherein the images shot in relation to the making of content comprises footage shot during the making of the content.

3. A system in accordance with claim 2, wherein the footage comprises dailies.

4. A system in accordance with claim 1, wherein the images shot in relation to the making of content comprises edited footage shot during the making of the content.

5. A system in accordance with claim 1, wherein the images shot in relation to the making of content comprises casting video.

6. A system in accordance with claim 1, wherein conducting the remote administration on the respective set top client device includes an option that authorizes the specific users to view the digital video data in its native resolution.

7. A system in accordance with claim 1, wherein video watermarks are inserted in images provided by the digital video data.

8. A system in accordance with claim 1, wherein the network comprises an intranet.

9. A system in accordance with claim 1, further comprising:
    securing the digital video data.

* * * * *

UNITED STATES PATENT AND TRADEMARK OFFICE
CERTIFICATE OF CORRECTION

| | | |
|---|---|---|
| PATENT NO. | : 9,196,304 B2 | Page 1 of 1 |
| APPLICATION NO. | : 11/627185 | |
| DATED | : November 24, 2015 | |
| INVENTOR(S) | : Theodore M. Shikuma | |

It is certified that error appears in the above-identified patent and that said Letters Patent is hereby corrected as shown below:

Title page, in the left hand column, in the Related U.S. Application Data item (60), delete "61/763,149" and insert --60/763,149--, therefor.

Signed and Sealed this
Seventh Day of June, 2016

Michelle K. Lee
*Director of the United States Patent and Trademark Office*